US012688655B2

(12) United States Patent
Iida et al.

(10) Patent No.: US 12,688,655 B2
(45) Date of Patent: Jul. 21, 2026

(54) INFORMATION PROCESSING APPARATUS, INFORMATION PROCESSING METHOD, AND RECORDING MEDIUM

(71) Applicant: Sony Group Corporation, Tokyo (JP)

(72) Inventors: Fumihiko Iida, Kanagawa (JP); Rei Minakami, Tokyo (JP); Kenta Abe, Kanagawa (JP); Yuji Kitazawa, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 313 days.

(21) Appl. No.: 18/283,619

(22) PCT Filed: Feb. 7, 2022

(86) PCT No.: PCT/JP2022/004596
§ 371 (c)(1),
(2) Date: Sep. 22, 2023

(87) PCT Pub. No.: WO2022/209297
PCT Pub. Date: Oct. 6, 2022

(65) Prior Publication Data
US 2024/0177425 A1      May 30, 2024

(30) Foreign Application Priority Data
Mar. 31, 2021      (JP) ................................ 2021-062191

(51) Int. Cl.
*G06T 19/00*      (2011.01)
*G06T 15/10*      (2011.01)

(52) U.S. Cl.
CPC ............ *G06T 19/003* (2013.01); *G06T 15/10* (2013.01); *G06T 2200/24* (2013.01)

(58) Field of Classification Search
CPC ... G06T 19/003; G06T 15/10; G06T 2200/24; G06F 3/011; H04N 21/26258; H04N 21/816; H04N 21/4728; H04N 21/21805; G09G 2340/0464; G09G 5/14; G09G 5/38; G09G 5/36
See application file for complete search history.

(56) References Cited

U.S. PATENT DOCUMENTS 9,389,682 B2 *   7/2016   Nakayama .......... G06F 3/04815
2003/0179218 A1 *   9/2003   Martins ................... G06T 19/00
345/633

(Continued)

FOREIGN PATENT DOCUMENTS

JP      2004-336175 A      11/2004
JP      2005-333278 A      12/2005

(Continued)

*Primary Examiner* — Phi Hoang
(74) *Attorney, Agent, or Firm* — Paratus Law Group, PLLC

(57)      ABSTRACT
An information processing apparatus according to an embodiment includes: a control unit (100) that, based on first space information regarding a distribution source space with which a plurality of pieces of content is associated and second space information regarding a viewing space in which the plurality of pieces of content is viewed, determines a presentation position of each of the plurality of pieces of content in the viewing space.

20 Claims, 17 Drawing Sheets

(56)                    References Cited

U.S. PATENT DOCUMENTS

| | | | | |
|---|---|---|---|---|
| 2006/0007239 A1* | 1/2006 | Harrison | ................. | G09G 5/02 |
| | | | | 345/590 |
| 2014/0267228 A1* | 9/2014 | Ofek | .................... | G06T 19/006 |
| | | | | 345/419 |
| 2019/0104235 A1 | 4/2019 | Sarkar | | |
| 2020/0171394 A1 | 6/2020 | Khan | | |
| 2020/0294311 A1 | 9/2020 | Holz | | |
| 2020/0341714 A1* | 10/2020 | Yuasa | ............... | H04N 21/8106 |
| 2021/0165557 A1* | 6/2021 | Agarawala | ............. | G06F 3/167 |
| 2023/0061045 A1* | 3/2023 | Alakuijala | ............... | G06T 5/20 |

FOREIGN PATENT DOCUMENTS

| | | |
|---|---|---|
| JP | 2010-232860 A | 10/2010 |
| JP | 2019050576 A | 3/2019 |
| JP | 2019-149122 A | 9/2019 |

* cited by examiner

START

↓

ACQUIRE ENVIRONMENT INFORMATION — S10

↓

ACQUIRE EVENT INFORMATION — S11

↓

ACQUIRE ACTION SCHEDULE OF USER — S12

↓

ASSIGNMENT OF EVENTS TO ENVIRONMENT — S13

↓

USER CORRECTION TO ASSIGNMENT — S14

↓

END

START

↓

ACQUIRE ENVIRONMENT INFORMATION — S100

↓

DATA INTEGRATION — S101

↓

MAP MEANING — S102

↓

STORE DATA — S103

↓

END (a)

(b)

(a)

(b)

|  | REFERENCE POINT COORDINATES | TAG | AREA INFORMATION |
|---|---|---|---|
| A | (5,1) | LIVING ROOM | 1 |
| B | (4,3) | BED | 1 |
| C | (1,1) | KITCHEN | 2 |
| D | (1,3) | BATHROOM | 3 |

| 520 | MAIN STAGE | SUB STAGE #1 | SUB STAGE #2 |
|---|---|---|---|
| 10:00 | PERFORMER A | | PERFORMER E |
| 10:30 | | PERFORMER C | |
| 11:00 | | | |
| 11:30 | PERFORMER B | | PERFORMER F |
| 12:00 | | PERFORMER D | |

| PERFORMER | GENRE | PREFERENCE OF USER | DEGREE OF PARTICIPATION OF USER | VENUE SIZE | ARRANGE-MENT AREA |
|---|---|---|---|---|---|
| PERFORMER W | ROCK | HIGH | LOW | LARGE | 1 |
| PERFORMER X | ROCK | LOW | LOW | MEDIUM | - |
| PERFORMER Y | IDLE | MEDIUM | HIGH | SMALL | 3 |
| PERFORMER Z | JAZZ | MEDIUM | LOW | SMALL | 2 |

(a)

(b)

| | MAIN | SUB #1 | SUB #2 | SUB #3 |
|---|---|---|---|---|
| 10:00 | | | | |
| 10:30 | W | X | Y | Z |
| 11:00 | | | | |
| 11:30 | A | | C | D |
| 12:00 | | B | | |

601 · 521

(c)

| | MAIN | SUB #1 | SUB #2 | SUB #3 |
|---|---|---|---|---|
| 10:00 | | | | |
| 10:30 | W | X | Y | Z |
| 11:00 | ☺ | | ☺ | ☺ |
| 11:30 | A | | C | D |
| 12:00 | | B ☺ | ☺ | |

601 · 521 · 620

(d)

(a)

530

501lay

500lay

502lay (b)

40

501lay

502lay

500lay (c)

40

501lay

500lay'

502lay'

(a)

(b)

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2022/004596 (filed on Feb. 7, 2022) under 35 U.S.C. § 371, which claims priority to Japanese Patent Application No. 2021-062191 (filed on Mar. 31, 2021), which are all hereby incorporated by reference in their entirety.

FIELD

The present disclosure relates to an information processing apparatus, an information processing method, and a recording medium.

BACKGROUND

With the development of high-speed communication networks, real-time distribution of events such as music live shows has become active. On the other hand, in an actual event, a moving experience before and after participation in the event is important for the user to obtain a sense of immersion. In particular, in the case of a collective event (for example, a music festival) performed by a plurality of performers or places, the experience of actively moving between venues is very important for the user to obtain a sense of immersion.

Patent Literature 1 discloses a technique for switching a viewpoint of a video in a head mounted display. According to the technique described in Patent Literature 1, it is possible to switch and display a video of a certain venue and a video of another venue in a music festival or the like.

CITATION LIST

Patent Literature

Patent Literature 1: JP 2019-149122 A

SUMMARY

Technical Problem

However, in the technique described in Patent Literature 1, movement of the user between a plurality of venues is not considered, and it is difficult to give a sufficient sense of immersion in a remote event experience in which a sense of immersion is required.

An object of the present disclosure is to provide an information processing apparatus, an information processing method, and a recording medium capable of giving a user a more immersive feeling in a remote event by distribution.

Solution to Problem

For solving the problem described above, an information processing apparatus according to one aspect of the present disclosure has a control unit that, based on first space information regarding a distribution source space with which a plurality of pieces of content is associated and second space information regarding a viewing space in which the plurality of pieces of content is viewed, determines a presentation position of each of the plurality of pieces of content in the viewing space.

BRIEF DESCRIPTION OF DRAWINGS

FIG. 17 is a schematic diagram illustrating an example of information that is applicable to an embodiment and is used to determine an arrangement of each content.

DESCRIPTION OF EMBODIMENTS

Figure 1:
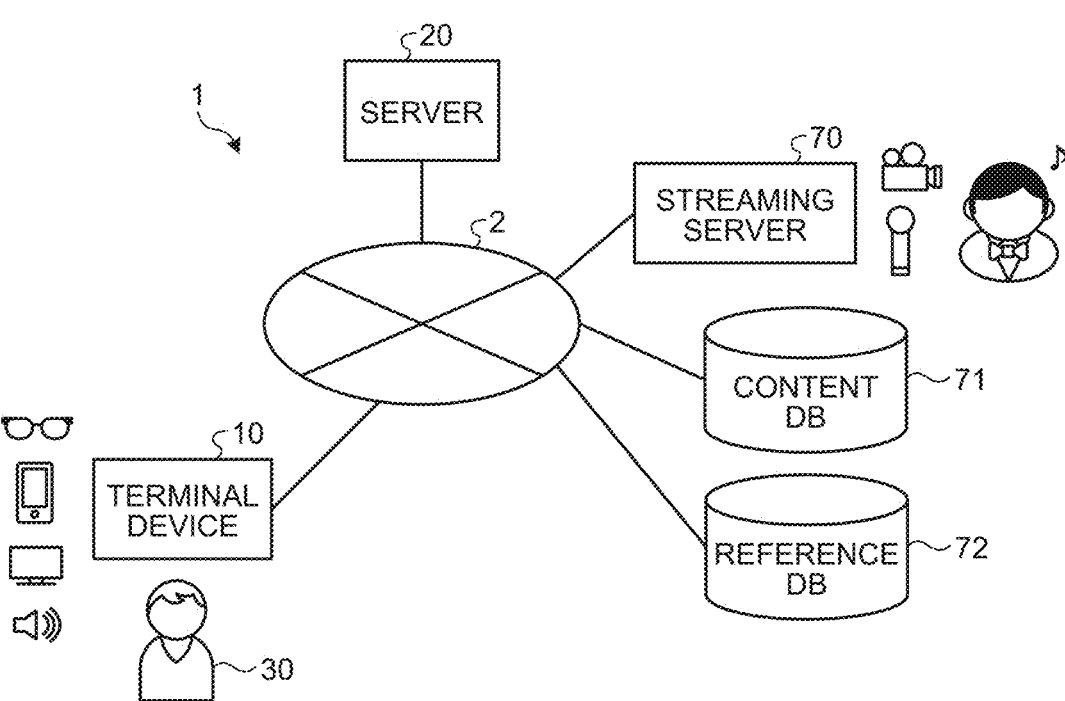
FIG. 1 is a schematic diagram illustrating a configuration of an example of an information processing system applicable to an embodiment.

Hereinafter, embodiments of the present disclosure will be described in detail with reference to the drawings. Note that, in the following embodiments, the same parts are denoted by the same reference signs, and redundant description will be omitted.

Hereinafter, the embodiments of the present disclosure will be described in the following order.

1. Outline of embodiment of present disclosure
2. Configuration applicable to embodiment
3. Processing according to embodiment
3-1. Outline of processing according to embodiment
3-2. Details of processing according to embodiment
3-2-1. Environment information acquisition processing
3-2-2. Assignment of events to viewing environment
4. Viewing processing according to embodiment

1. Outline of Embodiment of Present Disclosure

First, an embodiment of the present disclosure will be schematically described. The present disclosure relates to a technique for viewing an event held in a three-dimensional space in a viewing space remote from a place where the event is held.

More specifically, the event is held using a plurality of venues in the three-dimensional space. The three-dimensional space in which each venue is installed may be a real space or a virtual space generated by executing a program on a computer. Each venue is associated with content. A type of the event is not particularly limited as long as a performer presents content to an audience on a stage or the like. When the event is a music event, the content is, for example, performance related to music such as singing, playing, and dancing of music.

Here, as the event, a collective event in which a plurality of performers appear is assumed using a plurality of venues. When the event relates to music, such a collective event is called a music festival or the like. Hereinafter, the collective event may be simply described as an "event".

An information processing system according to an embodiment of the present disclosure sets, for example, a user's home or the like remote from a place where the event is held as a viewing space for viewing the event. The information processing system according to the embodiment acquires first space information regarding a three-dimensional space as a distribution source space with which a plurality of pieces of content is associated. Furthermore, the information processing system according to the embodiment acquires second space information regarding a viewing space in which the user views the plurality of pieces of content in the event. The information processing system according to the embodiment determines each presentation position at which each of the plurality of pieces of content is presented in the viewing space on the basis of the acquired first and second space information.

In the embodiment of the present disclosure, with such a configuration, the user can experience movement between a plurality of venues in a pseudo manner in the viewing space, and it is possible to give the user a more immersive feeling in the remote event by distribution.

2. Configuration Applicable to Embodiment

Next, a configuration applicable to the embodiment will be described. FIG. 1 is a schematic diagram illustrating a configuration of an example of an information processing system applicable to the embodiment. In FIG. 1, an information processing system 1 according to the embodiment includes a terminal device 10 and a server 20 communicably connected to each other by a network 2 such as the Internet. Note that, in FIG. 1, the server 20 is illustrated as a single device, but this is an example, and the server 20 may be configured by a computer group including a plurality of computers in which functions are distributed, or may be a plurality of computers coupled by a cloud computing technology.

The terminal device 10 constitutes the information processing apparatus according to the embodiment, is used by a user 30 who views content due to an event, and a glasses-type device (eyewear device) which is a wearable device, a smartphone, or the like can be applied as the terminal device. The present disclosure is not limited thereto, and the terminal device 10 may be a general information processing apparatus such as a personal computer or a game device, and may be configured by connecting a flat panel display (FPD). Furthermore, the terminal device 10 can output audio using an audio output device such as a speaker, a headphone, or an earphone. Hereinafter, unless otherwise specified, the terminal device 10 will be described as an eyewear device.

Note that the eyewear device applicable as the terminal device 10 may be a so-called see-through type head mounted display (augmented reality (AR) glasses) that transmits an image of a real space, or may be a goggle type (virtual reality (VR) goggles) that does not transmit an image of the real space. In a case where the VR goggles are used as the terminal device 10, it is preferable to provide a means by which the user 30 wearing the terminal device 10 can easily confirm the surrounding situation that is the real space, for example, by making it possible to display an image obtained by imaging the surroundings by an outward camera provided in the VR goggles.

In the example of FIG. 1, a streaming server 70, a content database (DB) 51, and a reference DB 72 are further connected to the network 2. The streaming server 70 processes video data of the real-time event. For example, the streaming server 70 performs processing of distributing the video data being captured at each venue of the event via the network 2. The content DB 71 accumulates, for example, the video data distributed by the streaming server 70. The reference DB 72 manages information related to the video data distributed by the streaming server 70 and the video data accumulated in the content DB 71. The reference DB 72 manages, for example, a holding date, holding information, and the like related to the video data.

Note that, in the above description, the terminal device 10 has been described to constitute the information processing apparatus according to the embodiment, but this is not limited to this example. For example, the information processing apparatus according to the embodiment may be configured by the entire information processing system 1 including the terminal device 10 and the server 20.

Figure 2:
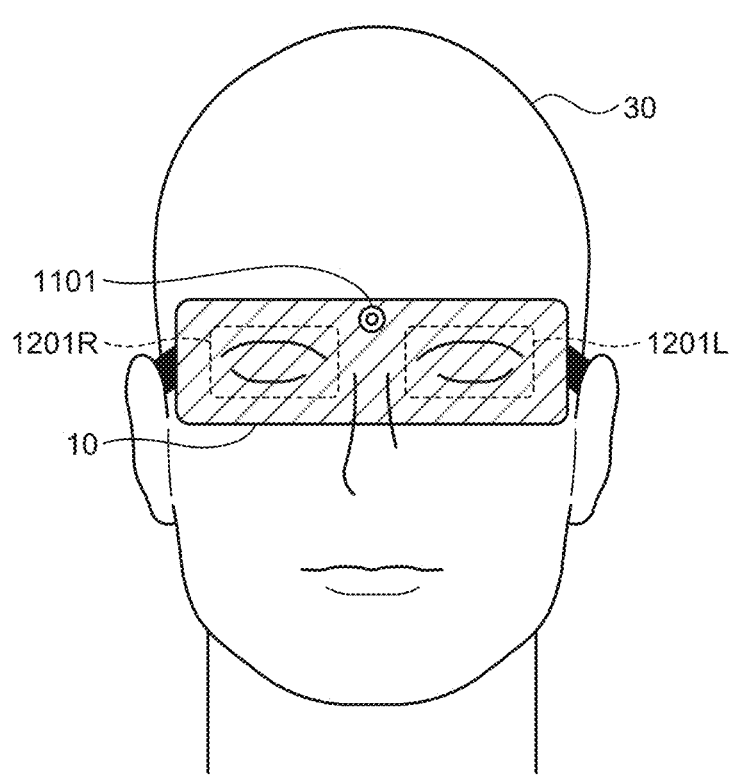
FIG. 2 is a schematic diagram schematically illustrating an appearance of an example of a terminal device as eyewear applicable to an embodiment.

FIG. 2 is a schematic diagram schematically illustrating an appearance of an example of the terminal device 10 as an eyewear device applicable to the embodiment. A main body of the terminal device 10 is generally a glasses-type or goggle-type device, and is used by being worn on the head of the user 30, and can realize superimposed display of digital information with respect to the visual fields of both eyes or one eye of the user 30, enhancement or attenuation of an image of a specific real object, deletion of an image of a specific real object to make the real object appear as if the real object does not exist at all, and the like. FIG. 2 illustrates a state in which the terminal device 10 is worn on the head of the user 30.

In FIG. 2, in the terminal device 10, a display unit 1201L for the left eye and a display unit 1201R for the right eye are disposed in front of the left and right eyes of the user 30, respectively. The display units 1201L and 1201R are transparent or translucent, and are capable of superimposing and displaying a virtual object on a scenery in a real space, emphasizing or attenuating an image of a specific real object, deleting an image of a specific real object to make the real object image appear as if the real object image does not exist at all, and the like. The left and right display units 1201L and 1201R may be independently display-driven, for example, to display a parallax image, that is, a virtual object as three-dimensional information. Furthermore, an outward camera 1101 directed in a line-of-sight direction of the user 30 is disposed substantially at a center of the terminal device 10.

Figure 3:
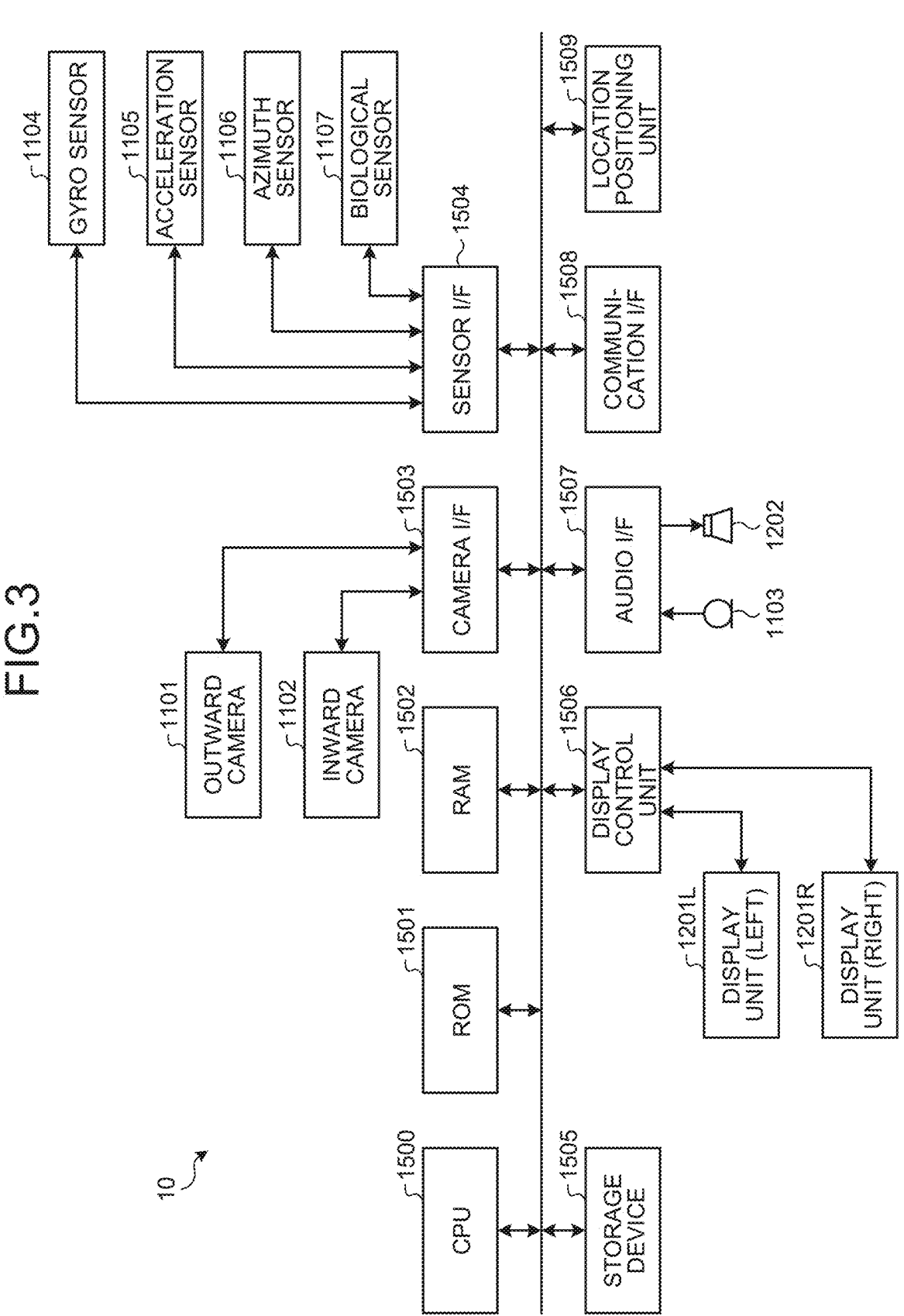
FIG. 3 is a block diagram illustrating a hardware configuration of an example of the terminal device as eyewear applicable to the embodiment.

FIG. 3 is a block diagram illustrating a hardware configuration of an example of the terminal device 10 as an eyewear device applicable to the embodiment. In FIG. 3, the terminal device 10 includes a CPU 1500, a read only memory (ROM) 1501, a random access memory (RAM) 1502, a camera interface (I/F) 1503, a sensor I/F 1504, a storage device 1505, a display control unit 1506, an audio I/F 1507, a communication I/F 1508, and a location positioning unit 1509, which are communicably connected to each other via a bus 1520. As described above, the terminal device 10 has a configuration as a computer (information processing apparatus) including a CPU, a memory, and various I/Fs.

The storage device 1505 is a nonvolatile storage medium such as a flash memory. The CPU 1500 operates using the RAM 1502 as a work memory according to an information processing program stored in advance in the storage device 1505 or the ROM 1501, and controls the overall operation of the terminal device 10.

The camera I/F 1503 is an interface for the outward camera 1101 and an inward camera 1102, and supplies image signals output from the outward camera 1101 and the inward camera 1102 to the bus 1520. Furthermore, a control signal for controlling the outward camera 1101 and the inward camera 1102, which is generated by the CPU 1500 according to the information processing program, is transmitted to the outward camera 1101 and the inward camera 1102 via the camera I/F 1503.

The sensor I/F 1504 is an interface for a gyro sensor 1104, an acceleration sensor 1105, an azimuth sensor 1106, and a biological sensor 1107, and sensor signals output from the gyro sensor 1104, the acceleration sensor 1105, the azimuth sensor 1106, and the biological sensor 1107 are supplied to the bus 1520 via the sensor I/F 1504.

The display control unit 1506 controls display operation by the display units 12011 and 1201R in accordance with a command from the CPU 1500. For example, the display control unit 1506 converts a display control signal generated by the CPU 1500 according to the information processing program into a display signal displayable by the display units 1201L and 1201R, and supplies the display signal to the display units 1201L and 1201R.

The audio I/F 1507 is an interface for a microphone 1103 and a sound output unit 1202. For example, the audio I/F 1507 converts an analog sound signal based on sound collected by the microphone 1103 into a digital sound signal and supplies the digital sound signal to the bus 1520. Furthermore, the audio I/F 1507 converts a signal into a signal in a format that can be reproduced by the sound output unit 1202 on the basis of a digital sound signal generated by the CPU 1500 according to the information processing program and supplied via the bus 1520, for example, and supplies the signal to the sound output unit 1202.

The communication I/F 1508 controls communication of the terminal device 10 with respect to the network 2 according to a command of the CPU 1500.

The location positioning unit 1509 measures the current position of the terminal device 10. The location positioning unit 1509 performs positioning by using, for example, a global navigation satellite system (GNSS) or Wi-Fi (registered trademark) connection information.

Figure 4:
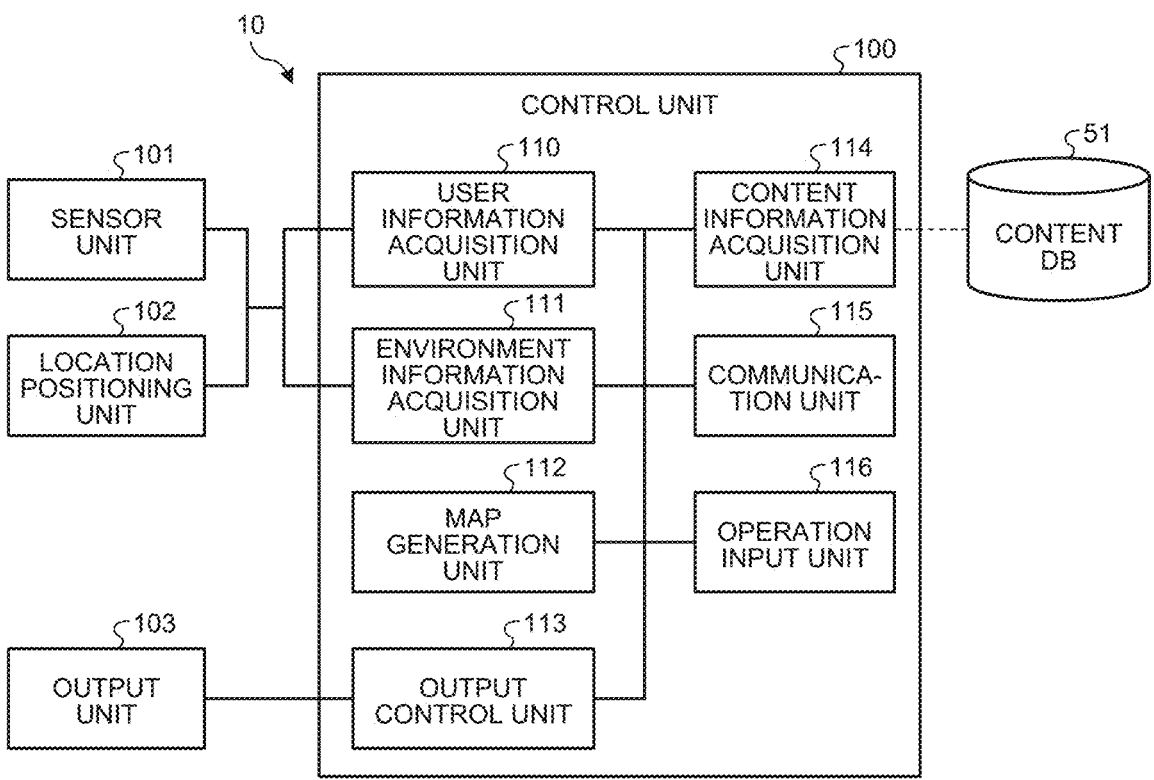
FIG. 4 is a functional block diagram of an example for explaining functions of the terminal device according to the embodiment.

FIG. 4 is a functional block diagram of an example for explaining functions of the terminal device 10 according to the embodiment. The terminal device 10 includes a control unit 100, a sensor unit 101, a location positioning unit 102, and an output unit 103.

The sensor unit 101 includes various sensors for collecting an external environment for the user 30 wearing the terminal device 10 and a situation of the user 30. The sensor unit 101 includes, for example, the outward camera 1101 and the inward camera 1102 described with reference to FIG. 3, the microphone 1103, the gyro sensor 1104, the acceleration sensor 1105, the azimuth sensor 1106, and the biological sensor 1107.

The outward camera 1101 and the inward camera 1102 are typically electronic cameras that capture light having a wavelength in a visible light region. The wavelengths of the light to be captured by the outward camera 1101 and the inward camera 1102 may include an ultraviolet region to an infrared region, or may be limited to some wavelength ranges in these wavelength ranges. Furthermore, depth information of the environment may be measured using a plurality of the outward cameras 1101. Furthermore, the outward camera 1101 may be used in combination with a distance sensor such as a time of flight (ToF) sensor or an ultrasonic sensor.

In the inward camera 1102, line-of-sight information of the user 30 may be acquired, or biological information such as the number of blinks may be acquired. Furthermore, the environmental illuminance state of the like may be estimated from a size of the pupil.

The microphone 1103 is intended to grasp an external acoustic state and an utterance situation of the user 30. Furthermore, the microphone 1103 may be used for communication through a sound wave having a wavelength in an inaudible range. The principle of the microphone 1103 is not limited, such as a dynamic microphone or a condesa microphone.

The gyro sensor 1104, the acceleration sensor 1105, and the azimuth sensor 1106 are used to grasp a movement situation, a posture, and the like of the user 30. Furthermore, the gyro sensor 1104, the acceleration sensor 1105, and the azimuth sensor 1106 may be used together to improve positioning accuracy by the location positioning unit 102 described later.

The biological sensor 1107 measures a heartbeat, a volume of publication, and the like of the user 30. By measuring these, it is possible to grasp an activity state, tension state, and concentration state of the user 30.

The location positioning unit 102 corresponds to the location positioning unit 1509 in FIG. 2, and acquires location information indicating the current location of the user 30. The location positioning unit 102 acquires the position information by using radio waves by GNSS, communication by Wi-Fi, or the like.

In FIG. 4, the control unit 100 includes a user information acquisition unit 110, an environment information acquisition unit 111, a map generation unit 112, an output control unit 113, a content information acquisition unit 114, a communication unit 115, and an operation input unit 116. The user information acquisition unit 110, the environment information acquisition unit 111, the map generation unit 112, the output control unit 113, the content information acquisition unit 114, the communication unit 115, and the operation input unit 116 are configured by executing the information processing program according to the embodiment on the CPU 1500. Not limited to this, some or all of the user information acquisition unit 110, the environment information acquisition unit 111, the map generation unit 112, the output control unit 113, the content information acquisition unit 114, the communication unit 115, and the operation input unit 116 may be configured by hardware circuits that operate in cooperation with each other.

The content information acquisition unit 114 acquires, for example, a purchase state of content and a type of content stored in the storage device 1505. The content information acquisition unit 114 acquires data from an external server (for example, the content DB 71) as necessary. For example, in a case where a target event includes a plurality of types of content, the content information acquisition unit 114 can acquire information necessary for determination when the user 30 views the content from a plurality of external servers.

The user information acquisition unit 110 acquires various sensors included in the sensor unit 101 and position information measured by the location positioning unit 102. The user information acquisition unit 110 aggregates and manages each acquired information. The environment information acquisition unit 111 acquires environment information indicating the surrounding environment of the user 30 and map information on the basis of information such as a captured image captured by the outward camera 1101. Furthermore, the environment information acquisition unit 111 may refer to known information from a database such as separately acquired floor plan information as the environment information.

The map generation unit 112 generates an arrangement map for arranging content in the viewing space on the basis of the various types of information acquired by the environment information acquisition unit 111 and the data acquired from the content information acquisition unit 114. When generating the arrangement map, the map generation unit 112 determines compatibility with the environment according to each content. For example, it is conceivable that the compatibility determination by the map generation unit 112 is executed in consideration of the preference of the user 30 by calling the reference environment information stored in the storage device 1505 as the ideal viewing environment of the content.

The output control unit 113 presents information to the user 30 by the output unit 103. The output unit 103 includes, for example, the display units 1201L and 1201R in FIG. 3 and the sound output unit 1202. The contents of the information presented by the output control unit 113 can include a video related to content, audio, information regarding a content arrangement, and the like.

The operation input unit 116 detects an input operation of the user 30. The operation input unit 116 can detect the input operation of the user 30 using each sensor included in the sensor unit 101 described above. For example, the operation input unit 116 recognizes the hand of the user 30 from an image captured by the outward camera 1101, and can detect an input operation by using a hand tracking technology for tracking the movement of the recognized hand. Alternatively, a controller for the user 30 to perform an input operation may be connected to the terminal device 10, and the operation input unit 116 may detect the user operation on the controller.

The communication unit 115 communicates with the outside of the terminal device 10 by wired or wireless communication. The communication unit 115 performs, for example, communication with a terminal device used by another user, communication with a device worn by the user 30, an external information processing apparatus, or the like by Wi-Fi, Bluetooth (registered trademark), infrared communication, or the like, and acquires information necessary for various determinations or the like.

In the terminal device 10, the CPU 1500 executes the information processing program according to the embodiment to configure each of the user information acquisition unit 110, the environment information acquisition unit 111, the map generation unit 112, the output control unit 113, the content information acquisition unit 114, the communication unit 115, and the operation input unit 116 described above on a main storage area in the RAM 1502 as, for example, a module.

The information processing program can be acquired from the outside (for example, the server 20) via the network 2 such as a LAN or the Internet by communication via the communication I/F 1508, for example, and can be installed on the terminal device 10. In this case, the information processing program is stored and saved in a storage medium included in the server 20. The present disclosure is not limited thereto, and the information processing program may be provided by being stored in a detachable storage medium such as a compact disk (CD), a digital versatile disk (DVD), or a universal serial bus (USB) memory.

3. Processing According to Embodiment

Next, processing according to the embodiment will be described.

3-1. Outline of Processing According to Embodiment

Processing according to the embodiment will be schematically described. Information required in the processing according to the embodiment is roughly divided into the following two.

(A) Information regarding content viewed by the user 30

(B) Information regarding an environment in which the user 30 views

The information (A) regarding the content viewed by the user 30 includes, for example, a performer, a performance form, and the like in a case where the event is a music live show. As the information regarding the content, position information indicating a position where the content is presented in the distribution source space and a time table indicating a time zone in which the content is presented may be included. Furthermore, the environment in (B) in which the user 30 views includes, for example, a device used for viewing, surrounding space information (furniture type, arrangement, and the like) regarding a surrounding space in a place where the user 30 views, and the like. In the embodiment, by associating the information regarding the content with the information regarding the environment for viewing, when the content is arranged in the real space (such as the home of the user 30), arrangement with high affinity between the content and the real space is realized.

In order to realize content arrangement with high affinity between the content and the real space, it is desirable that the content to be viewed and the environment for viewing coincide with each other. Furthermore, in a case where the user 30 explicitly moves in the real space and the environment for viewing is changed, it is desirable that content transition occurs according to the movement. For example, disconnection of viewing at the time of the content transition leads to deterioration of viewing experience.

Therefore, in the embodiment, for example, at the time of the content transition accompanying the movement of the user 30, fade-in and fade-out processing (cross-fade processing) may be inserted while considering reading of a video (content) after the transition. Furthermore, in a case where it is difficult to cope with buffering of a video due to an influence of a communication speed or the like, a preceding output of a video with reduced image quality or a preceding output of only audio may be performed.

Hereinafter, an automatic arrangement of the content with respect to the viewing space and the transition accompanying the movement of the user 30 according to the embodiment will be described more specifically. The processing described below is mainly executed by the environment information acquisition unit 111, the map generation unit 112, and the content information acquisition unit 114 in the functional block diagram of FIG. 4.

Figures 5, 6:
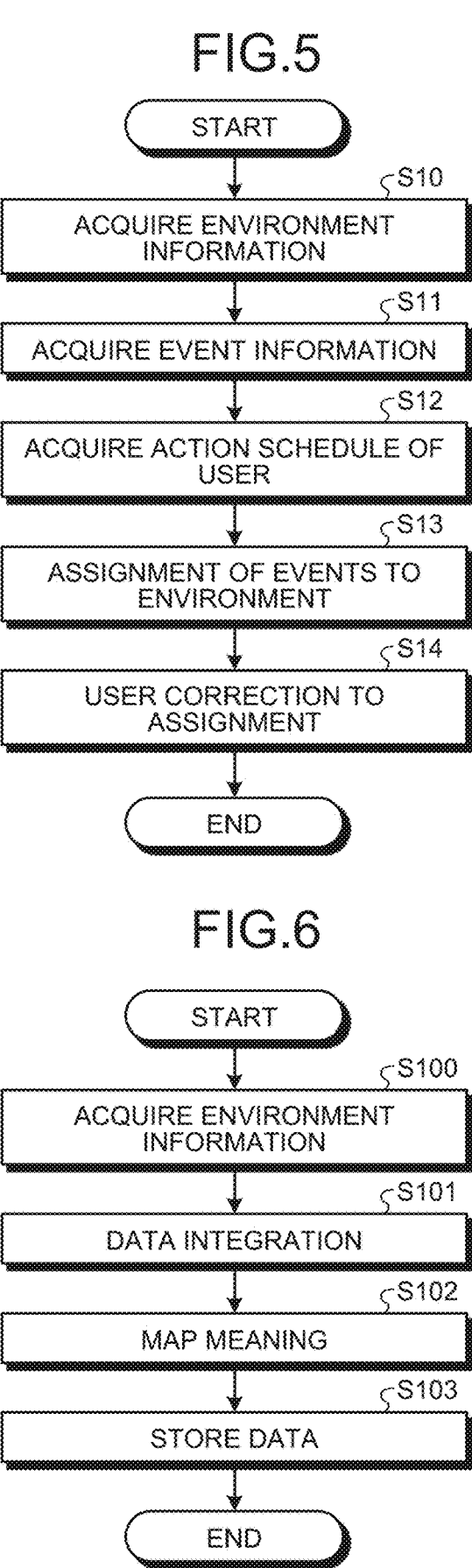
FIG. 5 is a flowchart of an example schematically illustrating an information processing method according to an embodiment.
FIG. 6 is a flowchart illustrating an example of acquisition processing of acquiring environment information regarding a user according to an embodiment.

FIG. 5 is a flowchart of an example schematically illustrating an information processing method according to the embodiment.

Prior to the processing of the flowchart of FIG. 5, the user 30 wears the terminal device 10 (eyewear device) and activates the information processing program according to the embodiment. Furthermore, it is assumed that the user 30 acquires information of an event in advance that the user wants to view, and views the event at home. That is, in this case, the home of the user 30 constitutes a viewing space for viewing the event. Furthermore, as described above, the event is assumed to be a collective event in which a plurality of venues are provided and a plurality of performers appear.

In Step S10, in the terminal device 10, the control unit 100 acquires environment information for the user 30 by the environment information acquisition unit 111. The environment information acquisition unit 111 images the surroundings of the user 30 using, for example, the outward camera 1101 included in the terminal device 10, and acquires captured image data. For example, the control unit 100 models a surrounding three-dimensional shape on the basis of the captured image data, and generates a map of the viewing space.

In the next Step S11, the control unit 100 causes the content information acquisition unit 114 to acquire information on an event viewed by the user 30. For example, the content information acquisition unit 114 communicates with the reference DB 72 via the network 2, for example, and acquires information regarding an event designated by the user 30 from the reference DB 72. The information regarding the event acquired by the control unit 100 can include, for example, an event map based on map information indicating the positions of a plurality of venues prepared for the event and the like, and a time table indicating the progress of each venue in the event.

In the next Step S12, the control unit 100 acquires an action schedule in the event of the user 30 by the content information acquisition unit 114, for example. For example, the content information acquisition unit 114 causes the output control unit 113 to display the time table of the event on a display unit, and urges the user 30 to input a schedule. The content information acquisition unit 114 can acquire an action schedule of the user 30 in response to an input operation by the user 30.

In the next Step S13, the control unit 100 assigns an event to the environment of the user 30 by the map generation unit 112. That is, the map generation unit 112 assigns a presentation position of each piece of content presented at each venue in the event to the viewing space of the user 30 for each piece of content. At this time, the map generation unit 112 can set a plurality of viewing areas in the viewing space of the user 30, and assign each presentation position of each content to each of the plurality of viewing areas. The user 30 can move between the plurality of viewing areas set in the viewing space of the user 30. The map generation unit 112 presents information indicating each presentation position of each content assigned to the viewing space to the user 30 by the output unit 103 (for example, the display units 1202L and 1202R).

In the next Step S14, in a case where each presentation position of the content assigned to the viewing space in Step S13 is corrected by the user 30 by the map generation unit 112, the control unit 100 reflects the correction in the assignment of each display position of the content to the viewing space.

By applying the information processing system 1 according to the embodiment, for example, each presentation position of content to be presented at a plurality of venues for a collective event is assigned to the viewing space set at the home of the user 30. Therefore, for example, when viewing the collective event remotely, the user 30 can experience movement between the plurality of venues in the real space, for example, in the viewing space set at home, and can obtain a deeper immersive feeling.

3-2. Details of Processing According to Embodiment

Next, the processing according to the embodiment will be described in more detail.

3-2-1. Environment Information Acquisition Processing

First, the acquisition processing of acquiring the environment information regarding the user 30 by the information processing system 1 according to the embodiment described in Step S10 of FIG. 5 will be described in more detail. FIG. 6 is a flowchart illustrating an example of acquisition processing of acquiring environment information regarding the user 30 according to the embodiment.

In Step S100, the control unit 100 causes the environment information acquisition unit 111 to acquire environment information regarding the user 30. More specifically, the environment information acquisition unit 111 acquires image information on the environment related to the user 30, depth information, and position information of the terminal device 10 as the environment information on the basis of the outputs of the sensor unit 101 and the location positioning unit 102. For example, the environment information acquisition unit 111 acquires image information as RGB information based on color information of red (R), green (G), and blue (B) by the outward camera 1101 included in the sensor unit 101. Furthermore, the environment information acquisition unit 111 acquires depth information by the outward camera 1101.

Figure 7:
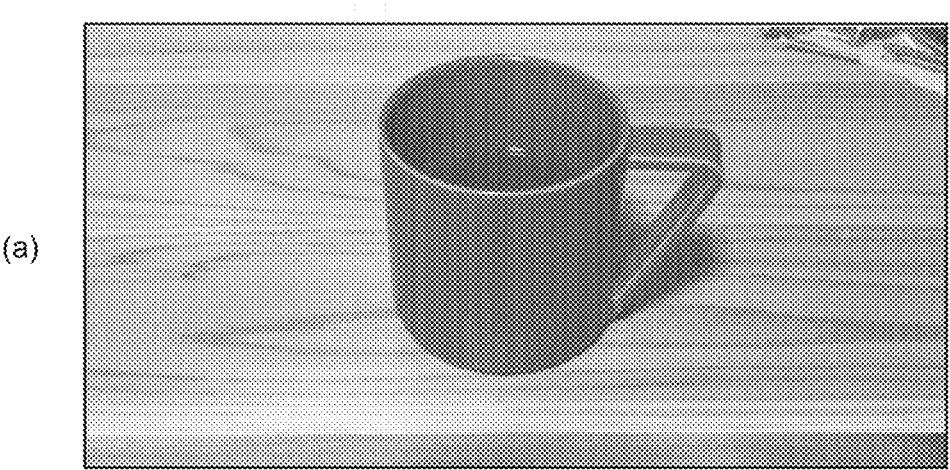
FIG. 7 is a schematic diagram illustrating an example of image information and depth information acquired by an outward camera.
Figure 7:
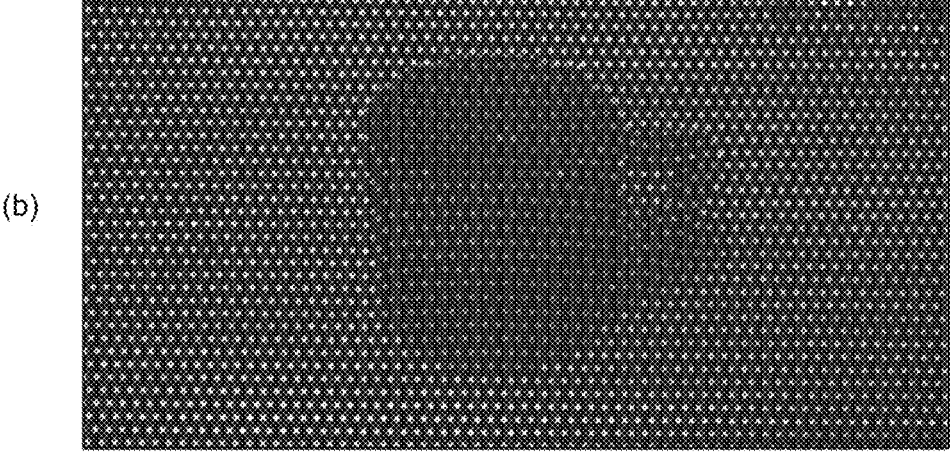

FIG. 7 is a schematic diagram illustrating an example of image information and depth information acquired by the outward camera 1101. In FIG. 7, a section (a) illustrates an example of the image information. Furthermore, a section (b) illustrates an example of the depth information. In the section (b), the depth information is acquired at a position of each dot.

Figure 8:
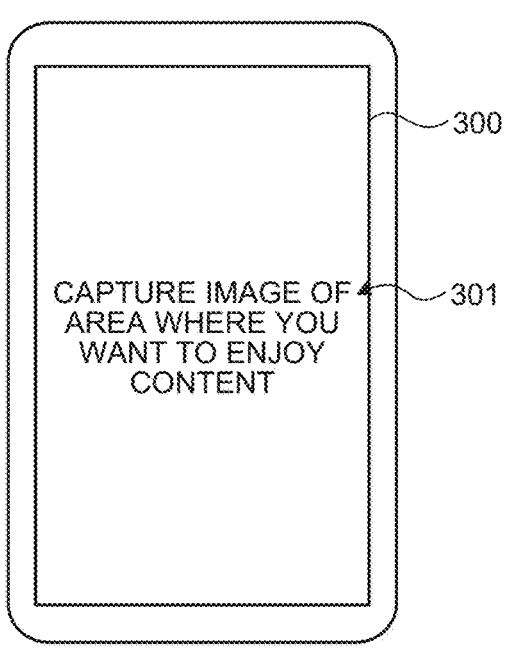
FIG. 8 is a schematic diagram illustrating an example of a user interface screen prompting a user to acquire image information and depth information of an appropriate region.

Note that, when acquiring the image information and the depth information, the environment information acquisition unit 111 may prompt the user 30 to acquire information of an appropriate region using a user interface user interface or the like so as to cover an assumed region (viewing space) used by the user 30 for the viewing experience this time. Note that the user interface includes at least one of a screen for presenting information to at least the user and an input unit for the user to input information. FIG. 8 is a schematic diagram illustrating an example of a user interface screen prompting the user 30 to acquire the image information and the depth information of an appropriate region. In FIG. 8, a user interface screen 300 is presented to the user 30 including a message 301 prompting acquisition of the image information and the depth information of the appropriate region by the output unit 103 (for example, the display units 1202L and 1202R).

The description returns to the flowchart of FIG. 6, and in the next Step S101, the control unit 100 integrates the environment information acquired in Step S100 by the environment information acquisition unit 111, and performs three-dimensional modeling of the environment regarding the user 30. As a three-dimensional modeling method, matching of feature amounts extracted based on image information and depth information is used.

Note that, in a case where predetermined accuracy cannot be obtained by the three-dimensional modeling, the environment information acquisition unit 111 may generate a floor plan model based on two-dimensional information. Furthermore, in a case where existing data (two-dimensional floor plan, three-dimensional scan data) or the like can be acquired, the environment information acquisition unit 111 may refer to the existing data in the subsequent process without performing these modeling processing.

Figure 9:
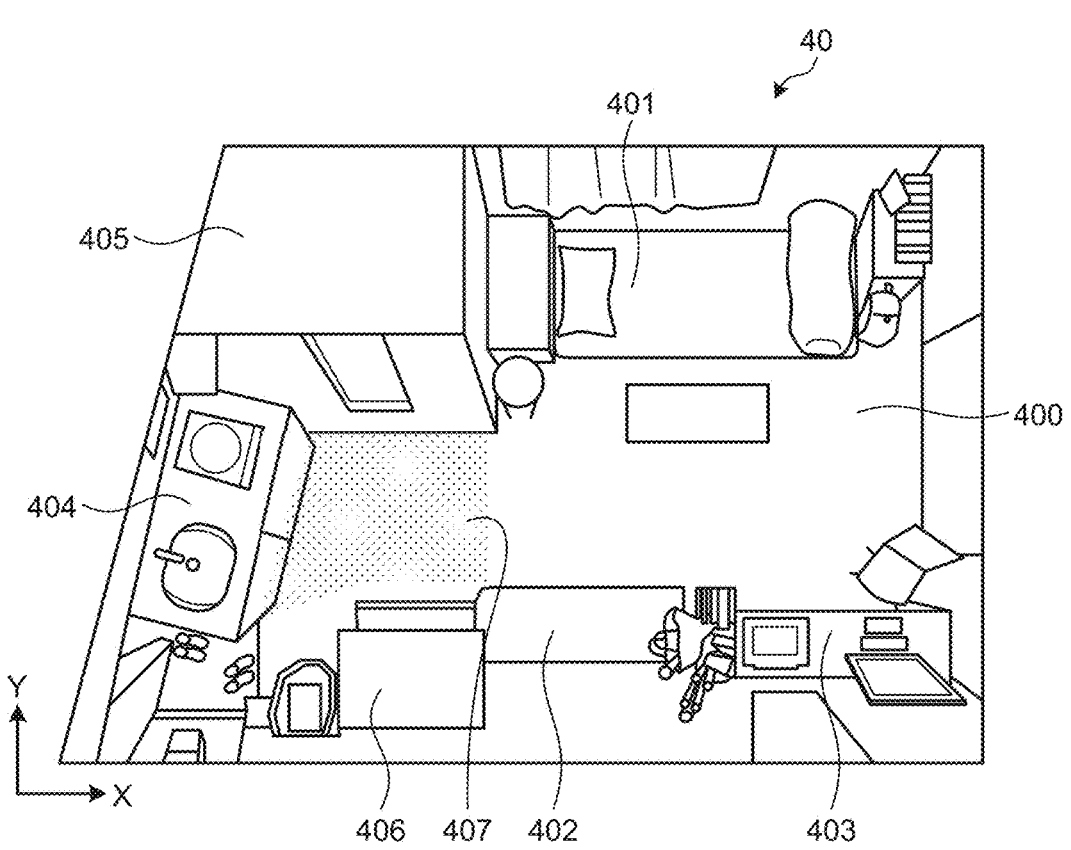
FIG. 9 is a schematic diagram illustrating an example of three-dimensional model data of an environment related to a user generated by data integration by an environment information acquisition unit.

FIG. 9 is a schematic diagram illustrating an example of the three-dimensional model data of the environment related to the user 30 generated by the data integration by the environment information acquisition unit 111 in Step S101. In FIG. 9, a three-dimensional model 40 based on three-dimensional model data corresponds to a viewing space in which the user 30 views an event. In the example of FIG. 9, the three-dimensional model 40 is assumed to three-dimensionally model a room of the user 30.

In a state where the three-dimensional model 40 is generated, information such as in which area in the three-dimensional model 40 the user 30 views the content is insufficient. Therefore, in the next Step S102, the control unit 100 causes the map generation unit 112 to give meaning to the three-dimensional model 40 and generate a map. At this time, the map generation unit 112 may hold a type of furniture or the like arranged in advance as data by object recognition or the like. Furthermore, the map generation unit 112 may refer to the past purchase history of the user 30 and the like, and may use the reference data for identifying the type.

In the example of FIG. 9, in the three-dimensional model 40, a living room 400 is recognized, a bed 401 and furniture 403 are recognized with respect to the living room 400, and an area 402 having a floor state different from that of the living room 400 is recognized. Furthermore, in the three-dimensional model 40, a kitchen unit 404 and a bathroom 405 are recognized. On the left side of the kitchen unit 404, an area 407 having a floor state different from that of the living room 400 is recognized, and furniture 406 is recognized adjacent to the area 407.

In the subsequent processing, in a case where the content and the viewing space are associated with each other, it is important which area in the viewing space which is the real space the user 30 is likely to view. Therefore, for example, an area in which the user 30 is likely to view the content may be explicitly set, and the point may be used as an arrangement reference point.

For example, the map generation unit 112 may urge the user 30 to set a viewing area having a high possibility of viewing the content among the units recognized in the three-dimensional model 40 using the user interface screen. The map generation unit 112 holds the set reference coordinates of each viewing area as a reference point of each viewing area.

At this time, the map generation unit 112 sets a plurality of viewing areas for the viewing space on the basis of at least one of division information, role information, structure information, surface information of the floor, shape information, and facility information, and incorporates the plurality of set viewing areas into the three-dimensional model 40. FIGS. 10A to 10D are schematic diagrams for explaining an example of a method of setting the plurality of viewing areas for the viewing space applicable to the embodiment.

Figure 10A:
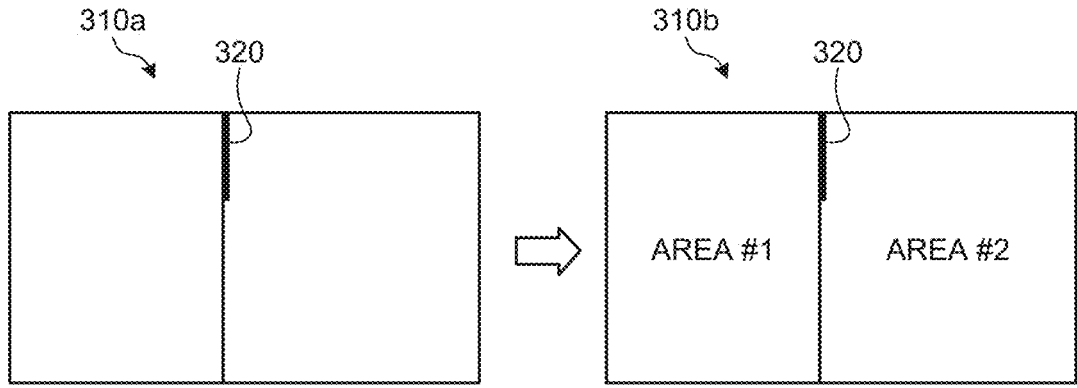
FIG. 10A is a schematic diagram for explaining an example of a method of setting a plurality of viewing areas for a viewing space, which is applicable to an embodiment.

FIG. 10A is a diagram illustrating an example in which a plurality of viewing areas is set for the viewing space by division information based on structure information indicating a structure of the viewing space. In FIG. 10A, a space of a viewing space 310a is physically divided by a structure 320 such as a door or a threshold, for example. In this case, the map generation unit 112 can set an area #1 and an area #2, which are different viewing areas, in separate spaces as illustrated in a space 310b.

Figure 10B:
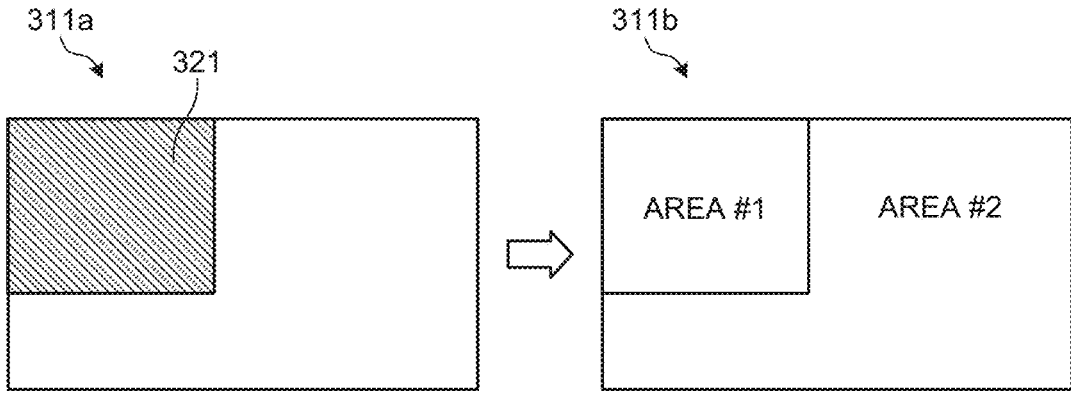
FIG. 10B is a schematic diagram for explaining an example of a method of setting a plurality of viewing areas for a viewing space, which is applicable to the embodiment.

FIG. 10B is a diagram illustrating an example in which a plurality of viewing areas is set for the viewing space based on division information based on the surface information of the floor of the viewing space. In FIG. 10B, in a viewing space 311a, a surface state of the floor is different between an area 321 and the other portion, and the surface information of the floor is different between these areas. For example, in a case where a portion other than the area 321 is a flooring floor, and the area 321 is covered with a carpet, or in a case where the floor of the area 321 is linolium, the surface information of the floor is different between the area 321 and the other portion. In this case, as illustrated in a space 311b, the map generation unit 112 can set an area #1 and an area #2, which are different viewing areas, in the area 321 and other portions.

Figure 10C:
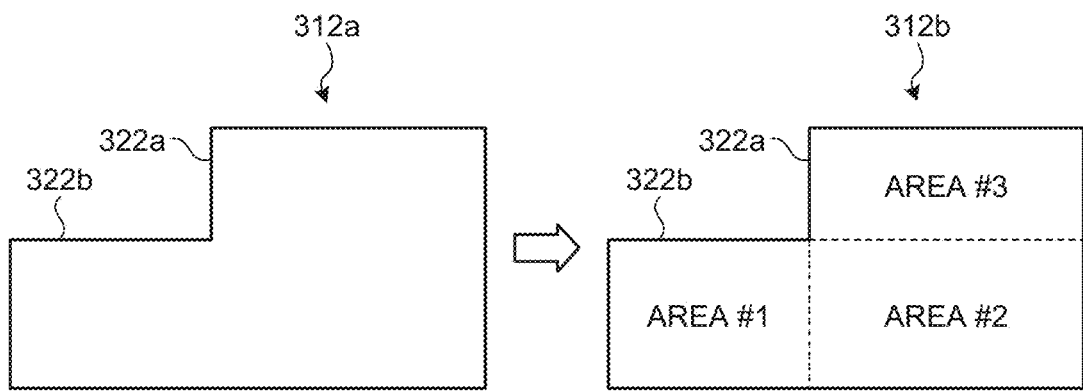
FIG. 10C is a schematic diagram for explaining an example of a method of setting a plurality of viewing areas for a viewing space, which is applicable to the embodiment.

FIG. 10C is a diagram illustrating an example in which a plurality of viewing areas is set for the viewing space based on division information based on shape information indicating the shape of the viewing space. In FIG. 10C, as illustrated in a space 312a, there may be a case where the space 312a may be divided by wall surfaces 322a and 322b even in an environment where a surface state of the floor and the like are the same or there is no division due to a structure. In this case, the map generation unit 112 can set an area #1 and an area #2 which are different viewing areas by extending the wall surfaces 322a and 322b as illustrated in a space 312b.

Figure 10D:
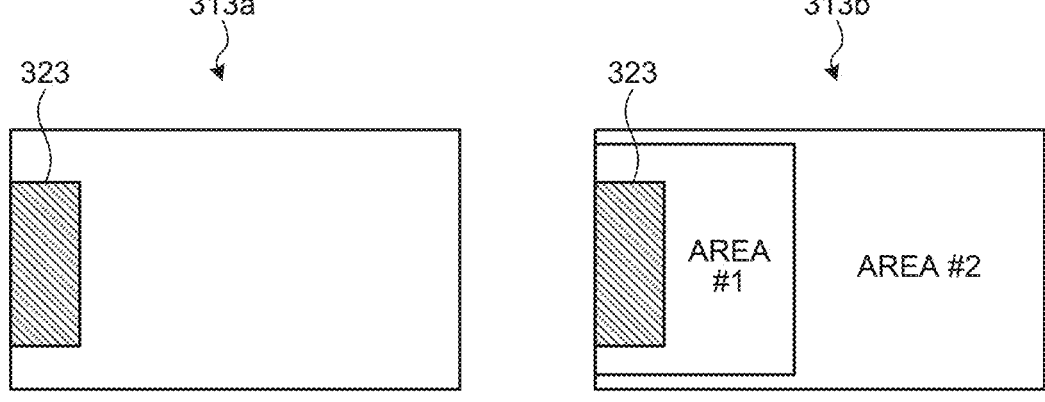
FIG. 10D is a schematic diagram for explaining an example of a method of setting a plurality of viewing areas for a viewing space, which is applicable to the embodiment.

FIG. 10D is a diagram illustrating an example in which a plurality of viewing areas is set for the viewing space based on division information based on facility information of a facility installed in the viewing space. In FIG. 10D, as illustrated in a space 313a, it is also conceivable that a facility 323, such as a kitchen unit, which clearly suggests that the contents of activity around the kitchen unit are different is disposed. Note that the facility 323 includes furniture, electrical appliances, and the like that are fixedly or movably installed in a space and used. In this case, as illustrated in a space 313b, the map generation unit 112 can set an area #1 and an area #2, which are different viewing areas, with the periphery of the facility 323 as different spaces. For example, it is conceivable that the map generation unit 112 determines a kitchen space if a stove or a kitchen unit is disposed as the facility 323, and determines a living room if a sofa is disposed. Moreover, a margin area may be set in advance according to furniture, and an area including the margin area may be set as a viewing area.

This is because the setting of the plurality of viewing areas with respect to the inside of the viewing space described with reference to FIGS. 10A to 10D is assumed to be a case where, when the content is arranged in the viewing space, it is necessary to avoid arranging the content across those separating the viewing space. For example, even in the same viewing space, in a case where the user 30 uses roles separately, an example thereof may be considered. Moreover, even in a studio, it is assumed that the kitchen and its surroundings are separated as separate spaces. These are held as area information.

The description returns to the flowchart of FIG. 6, and in Step S103, the control unit 100 stores the area information including the three-dimensional model data, the reference point data, and the like acquired in Steps S101 and S102 described above as environment data in, for example, the storage device 1505, and completes the environment recognition. In addition to the three-dimensional model data, the area information may include, for example, reference point coordinates and an area of each area, information regarding furniture to be disposed, seating availability, presence or absence of a surrounding hazardous object (presence or absence of a heated object, etc.), and soundproofing by a floor material or the like. The control unit 100 holds each item of the area information as, for example, a list.

Figure 11:
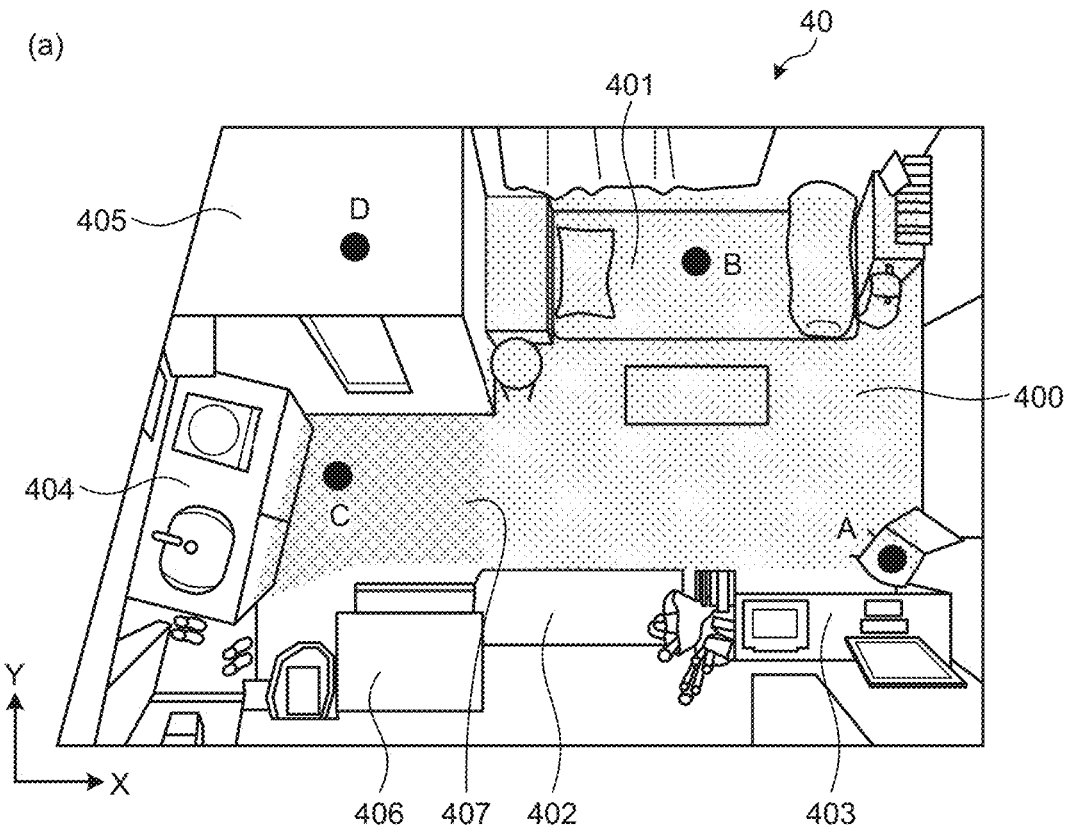
FIG. 11 is a schematic diagram illustrating an example of three-dimensional model data and area information stored by a control unit according to an embodiment.

FIG. 11 is a schematic diagram illustrating an example of three-dimensional model data and area information stored by the control unit 100 according to the embodiment. A section (a) in FIG. 11 illustrates an example in which reference positions A to D of each area are set with respect to the three-dimensional model 40. As the reference positions A to D, for example, any vertex coordinates of each area or coordinate positions obtained by averaging the vertex coordinates may be applied.

A section (b) in FIG. 11 illustrates an example of the area information (second space information). In the area information, items "reference point coordinates", "tag", and "area information" are associated with each of the reference positions A to D. The item "reference point coordinates"

indicates coordinates of the reference positions A to D. The item tag and the viewing area information are associated with each other. In the example of FIG. 11, in the area information, the item "tag" indicates meaning for each area, and an area by the reference position A is a "living room", an area by the reference position B is a "bed", an area by the reference position C is a "kitchen", and an area by the reference position D is a "bathroom". By these meanings, it can be determined that the area based on the reference positions A and B is an area having a role of relaxing, the area based on the reference position C is an area having a role of cooking or the like, and the area based on the reference position D is an area having a role of showering, bathing or the like. In other words, it can be said that the information indicated in the item "tag" is role information indicating the role of the corresponding area.

In the area information, the item "area information" indicates information to be set as a viewing area among the areas indicated by the reference positions A to D. In the example of FIG. 11, since the two areas indicated by the reference positions A and B are spatially continuous and have a common role, the two areas are integrated and set in the viewing area indicated by area information [1]. Furthermore, the area indicated by the reference position C is set as a viewing area indicated by area information [2], and the area indicated by the reference position D is set as a viewing area indicated by area information [3]. Note that the user 30 can move between the viewing areas indicated by the area information [1] to [3].

3-2-2. Assignment of Event to Viewing Environment

Next, processing of acquiring the event information and assigning the event information to the viewing environment by the information processing system 1 according to the embodiment described in Steps S11 to S13 in FIG. 5 will be described.

As the content which is a target of viewing by the user 30 in the event, there are content whose presentation time (time zone) and place are determined in advance and content whose presentation time and place are not determined in advance. Hereinafter, a description will be given for content whose time zone and place of presentation are determined in advance in an event.

Furthermore, content that should be particularly targeted by the embodiment is not content presented by a single performer, but is content presented in a so-called collective event in which a plurality of performers appear in parallel in a plurality of venues. Not limited to this, in the embodiment, even if the performer is a single performer, an exhibition type in which a plurality of pieces of content is distributed in parallel is also assumed. Therefore, in the following description, it is assumed that a plurality of pieces of content is distributed.

(About Weighting for the Plurality of Pieces of Content)

The plurality of pieces of content can be weighted. For example, as the weighting on a distribution side, weighting for each venue in the collective event is considered. That is, a distributor can highly weight the importance of the main venue in the collective event. Furthermore, the distributor can similarly perform weighting in the exhibition format.

On the other hand, the weighting on a side of the user 30 may be weighting based on the preference of the user 30. For example, the user 30 can perform weighting according to the viewing priority for the user 30, such as content presented by a performer that the user 30 is already a fan of. Furthermore, for example, the user 30 can also weight the genre of the content presented by the performer. For example, the control unit 100 presents a user interface indicating each item for which the user 30 performs weighting. The control unit 100 stores the weighting information input to the user interface.

(Space Arrangement of Each Venue in Real Space)

In a collective event or an exhibition format, a positional relationship between assumed pieces of content is often set on a distribution side (promoter side). On the basis of an event map that is prepared on the distribution side and indicates a positional relationship between the pieces of content, the positional relationship between the pieces of content is obtained. Note that, here, for the sake of explanation, it is assumed that an organizer of the event and a distributor that distributes the content presented in the event are the same.

Figures 12, 13:
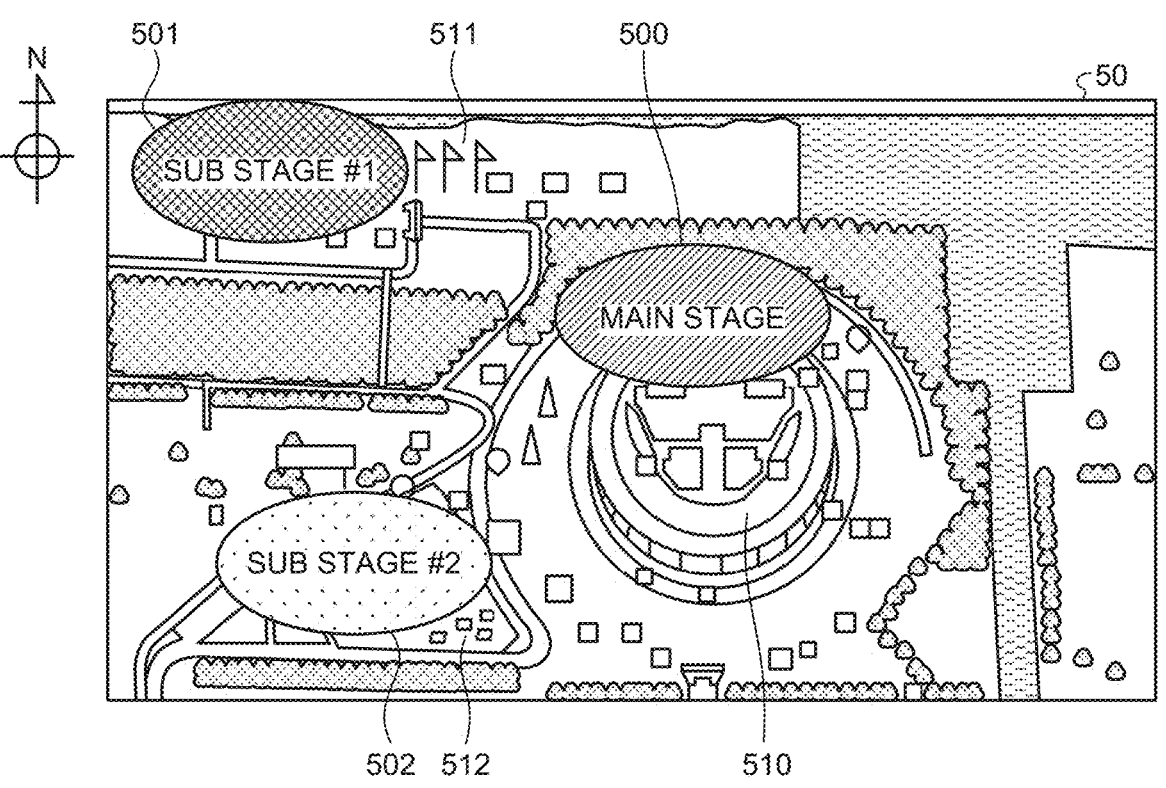
FIG. 12 is a schematic diagram illustrating an example of a map illustrating a setting of positional relationships among a plurality of pieces of content in a collective event.
FIG. 13 is a schematic diagram illustrating an example of a time table of an event created on a distribution side.

FIG. 12 is a schematic diagram illustrating an example of a map (event map) illustrating a setting of a positional relationship of a plurality of pieces of content in a collective event.

In FIG. 12, an event map 50 (first space information) describes a stage 500 that is a main stage of content presentation and stages 501 and 502 that are sub stages of content presentation, respectively. Note that, in FIG. 12, the stages 501 and 502 are also referred to as a sub stage #1 and a sub stage #2, respectively. The stage 500 is provided in a stadium 510, and the stages 501 and 502 are disposed on a beach 511 and a hill 512, respectively. In FIG. 12, assuming that an upper side is north (N), the stages 501 and 502 are disposed in the directions of the north west and the south west with respect to the stage 500, respectively.

Such the event map 50 is often held by the user 30 as knowledge in advance. Therefore, when disposing each content in the viewing space, it is also necessary to refer to the arrangement of each of the stages 500 to 502 on the event map 50.

Furthermore, not only the arrangement in the real space but also the spatial arrangement for distribution may be set. For example, the arrangement area may be changed according to a genre or a label of the content, and an amount of interactive participation.

(About Preset Map by Distribution Side)

Next, a preset map presented by the distribution side according to the embodiment will be described. For example, the distribution side generates, by the server 20, an initial layout when arranging a display position of each content in the viewing space of the user 30 on the basis of a positional relationship of each venue in the event and a time zone (time table) in which the content is presented by each performer in each venue. The distribution side presents the generated initial layout to the user 30 as a preset map by the server 20, for example.

FIG. 13 is a schematic diagram illustrating an example of a time table of an event created on the distribution side and acquired by the server 20, for example. In FIG. 13, a time table 520 indicates appearance time zones of performers A to F on each of the stages 500, 501, and 502 (described as a main stage, a sub stage #1, and a sub stage #2, respectively) on the event map 50 illustrated in FIG. 12. In the example of FIG. 13, the time table 520 indicates that the performer A performs in a time zone of the times [10:00] to [11:00] and the performer B performs in a time zone of the times [11:30] to [12:30] on the stage 500. Similarly, in the stages 501 and 502, performance time zones of the performers C to F are shown.

As illustrated in FIG. 12, the distributor defines in advance a positional relationship between the stages 500 to 502 for spatial arrangement. For example, in a case where the distributor initially arranges the content presented on each of the stages 500 to 502 in the viewing space of the user 30, the distributor refers to the positional relationship between the stages. The distributor prepares a grid of a two-dimensional plane by the server 20, for example, and creates a preset map by arranging regions corresponding to the stages 500 to 502 with respect to the grid.

Figure 14:
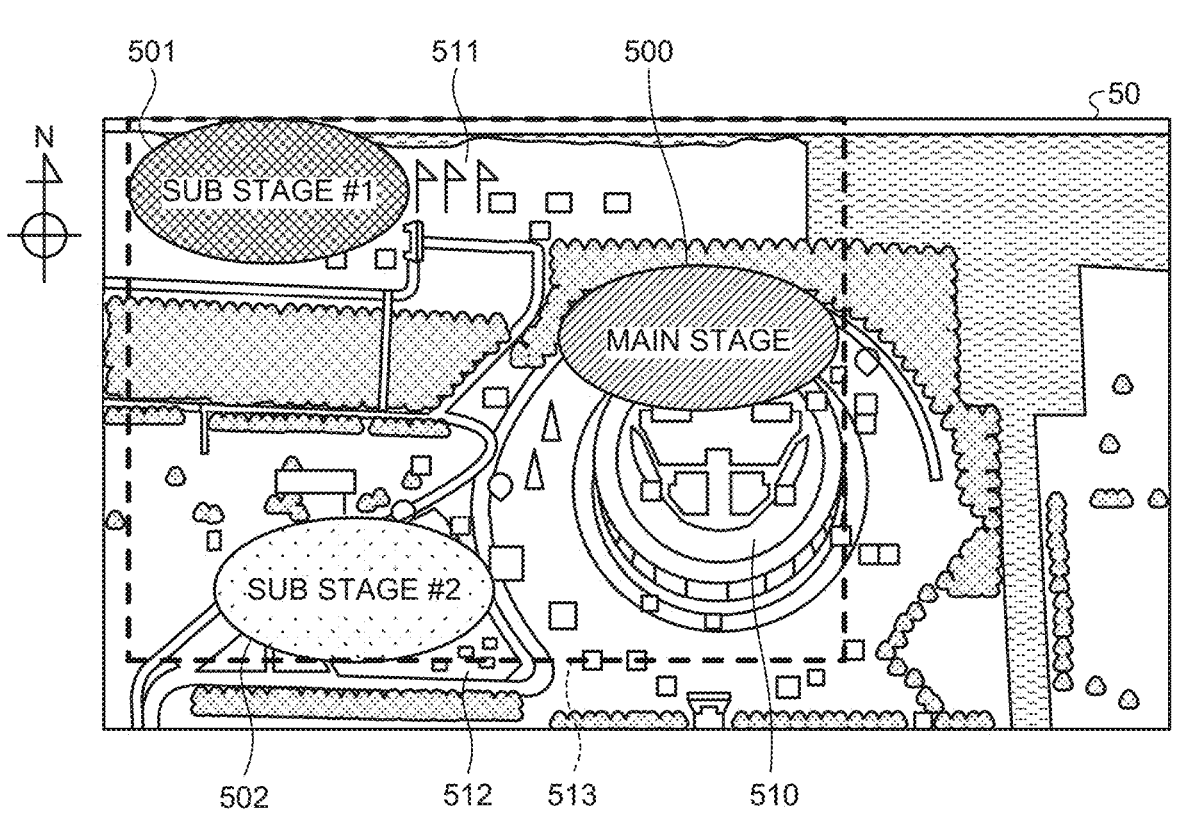
FIG. 14 is a diagram for explaining an arrangement of regions corresponding to stages with respect to a grid, which is applicable to an embodiment.
Figure 14:
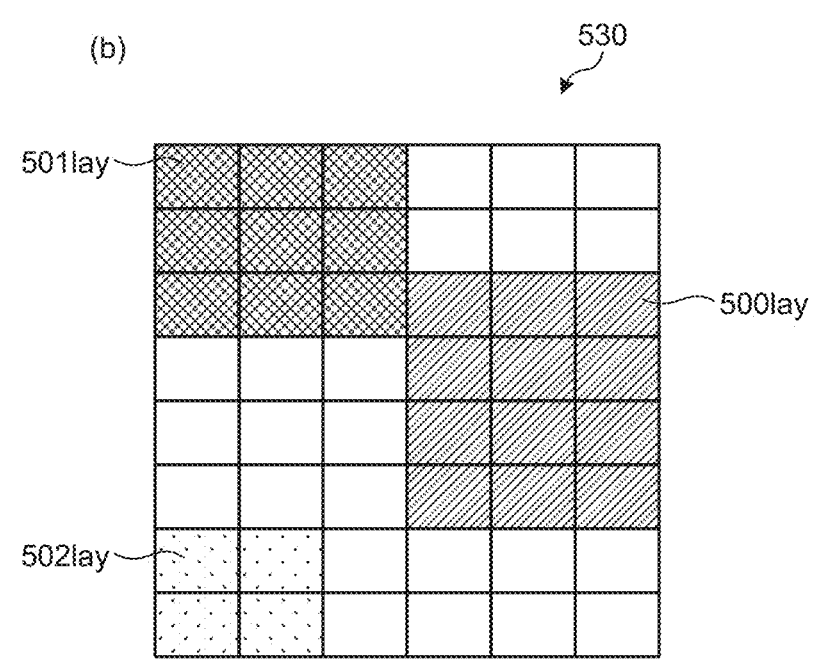

FIG. 14 is a diagram for explaining an arrangement of a region corresponding to each of the stages 500 to 502 with respect to the grid, which is applicable to the embodiment. In FIG. 14, a section (a) illustrates an event map 50, and a section (b) illustrates an example of a preset map 530. In the drawing, the preset map 530 includes a grid of a two-dimensional plane. It is assumed that the preset map 530 corresponds to a direction in which an upward direction corresponds to the north in the drawing.

A region 540 illustrated in the section (a) of FIG. 14 indicates a region to be arranged with respect to the preset map 530. In this example, regions 500*lay*, 501*lay*, and 502*lay* are automatically arranged on the preset map 530 in accordance with the grids, respectively, in accordance with a positional relationship and a size relationship among the stages 500, 501, and 502 on the event map 50.

That is, for example, the server 20 arranges a region 500*lay* corresponding to a stage 500 arranged at the east-end (right end) in the region 540 of the event map 50 at the right end, that is, the east-end of the preset map 530. For example, the server 20 arranges a region 501*lay* corresponding to a stage 501 arranged in the north west of the stage 500 on the event map 50 at the upper left of the preset map 530, that is, at a position in the north west with respect to the region 500*lay*. Similarly, for example, the server 20 arranges a region 502*lay* corresponding to a stage 502 arranged in the south west of the stage 500 on the event map 50 at the lower left of the preset map 530, that is, at a position to the south west with respect to the region 500*lay*.

Furthermore, in the example of the drawing, each of the regions 500*lay* to 502*lay* is arranged on the preset map 530 in a size proportional to a size of each of the corresponding stages 500 to 502.

Note that the distributor can manually set an inter-stage margin or the like for each of the regions 500*lay* to 502*lay* automatically arranged on the preset map 530 as in a section (b) of FIG. 14.

Furthermore, for example, according to the time table 520 illustrated in FIG. 13, the stage 501 (sub stage #1) is not used in a time zone of the times [10:00] to [10:30]. In this manner, in a case where there is a free time zone in each of the stages 500 to 502, for example, the server 20 may dynamically change the arrangement of each of the regions 500*lay* to 502*lay* on the preset map 530 by expanding the region 500*lay* corresponding to the stage 500 that is the main stage on the preset map 530.

Moreover, for example, the server 20 may execute the automatic arrangement with respect to the preset map 530 according to the attribute of the content presented at each venue without referring to the event map 50. For example, the server 20 can use the information on the genre or the fan of the performer as the attribute of the content and automatically arrange the regions adjacent to each other with respect to the preset map 530 for the content having overlapping genres or fans. Furthermore, for example, the server 20 may execute automatic arrangement for content of different genres in consideration of securing a margin between the regions or the like.

Moreover, for example, the server 20 may set, in the preset map 530, a transition region that gives an effect or the like on the content in a case where the content transitions to another content at a boundary between adjacent or close regions (for example, the region 500*lay* and the region 501*lay*). Furthermore, for example, the server 20 may arrange a region for presenting other content not presented on the actual stages 500 to 502 in a region where the regions 500*lay* to 502*lay* in which the content is presented on the preset map 530 are not arranged.

Figure 15:
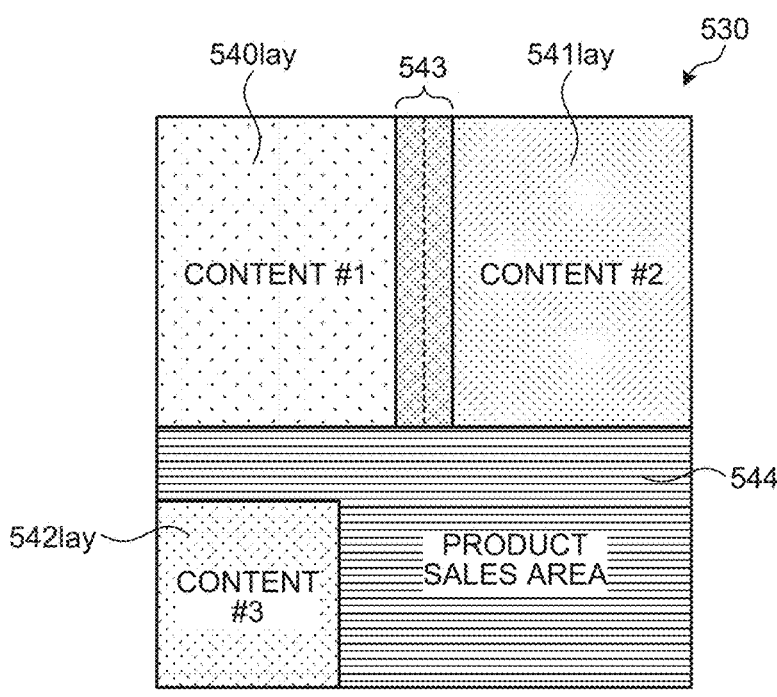
FIG. 15 is a schematic diagram illustrating an example of arranging regions other than a venue in an event on a preset map, which is applicable to an embodiment.

FIG. 15 is a schematic diagram illustrating another example of the preset map 530 applicable to the embodiment. In FIG. 15, regions 540*lay*, 541*lay*, and 542*lay* arranged on the preset map 530 are regions corresponding to respective venues where pieces of content #1, #2, and #3 are respectively presented in the event. A region 543 is a region arranged including a boundary between the region 540*lay* and the region 541*lay* adjacent to each other, and is a transition region for presenting a predetermined effect in a case where the content transitions to another content. The predetermined effect in the transition region includes at least one of a visual effect and an auditory effect. As a specific example of the effect, cross-fade processing of the content before the transition and the content after the transition can be considered. The present disclosure is not limited thereto, and a moving video indicating a state of moving in a region of the real space corresponding to the region 540*lay* and the region 541*lay* may be created in advance and presented in the region 543 in the viewing space viewed by the user 30.

In FIG. 15, a region 544 is a region in which content different from the content #1, #2, and #3 presented at each venue in the event is arranged, and is, for example, a region for product sales that sells items and the like. In the viewing space viewed by the user 30, an item can be purchased by electronic payment in the region 544.

The server 20 stores the generated preset map 530 in, for example, the reference DB 72. The present disclosure is not limited thereto, and the server 20 may store the generated preset map 530 in its own storage medium.

Note that, in the above description, the server 20 generates the preset map 530, but this is not limited to this example. For example, the preset map 530 can be generated in the terminal device 10. In this case, the terminal device 10 acquires the event map 50 and the time table 520 from the server 20, and generates the preset map 530 on the basis of the acquired event map 50 and time table 520. The terminal device 10 stores the generated preset map 530 in, for example, the storage device 1505.

(Assignment of Content to Viewing Space)

Next, the association between the preset map 530 and the viewing space in which the user 30 views the content will be described.

Figure 16:
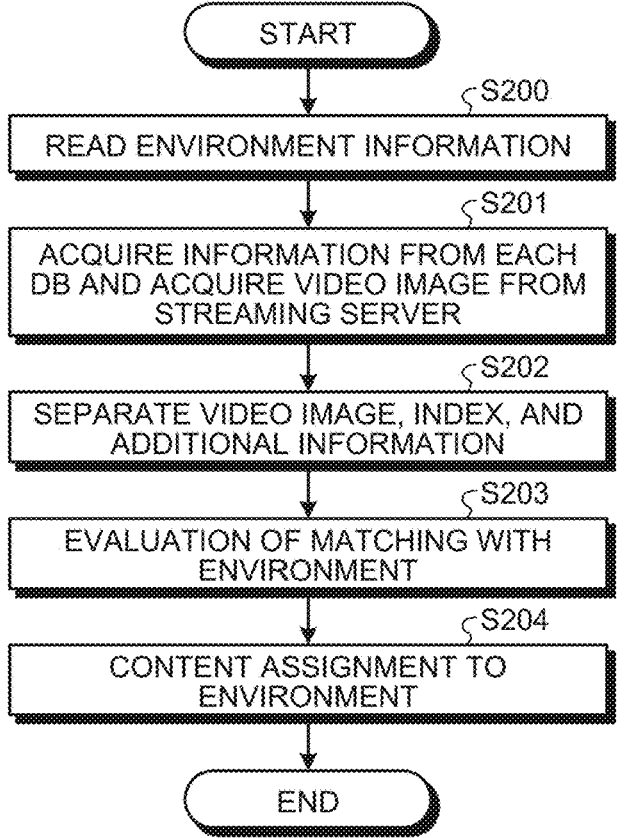
FIG. 16 is a flowchart illustrating an example of content assignment processing with respect to a viewing space according to the embodiment.

FIG. 16 is a flowchart illustrating an example of content assignment processing with respect to the viewing space according to the embodiment; Each processing according to the flowchart of FIG. 16 is executed by the control unit 100 in the terminal device 10.

In Step S200, the control unit 200 reads the environment data acquired and stored in the processing according to the flowchart of FIG. 6.

In next Step S201, the control unit 100 causes the content information acquisition unit 114 to acquire the video data from the content DB 71, and causes the communication unit 115 to acquire the information related to the video data from the reference DB 72. The information related to the video data acquired from the reference DB 72 includes the preset map 530 and the time table 520. Furthermore, for example, in a case where an event has started, the control unit 100 acquires video data of the event to be distributed from the streaming server 70 by communication of the communication unit 115.

In the next Step S202, the control unit 100 separates video data, an index for the video data, and additional information added to the video data from the video data acquired from the streaming server 70 and the content DB 71 in Step S201. The index and the additional information can include, for example, information indicating a venue (stage) where the corresponding video data is captured.

In the next Step S203, the control unit 100 causes the map generation unit 112 to perform matching evaluation between each venue (stage) where the content is presented in the event and the environment related to the user 30 based on the environment data, that is, the viewing space of the user 30. In the next Step S204, the control unit 100 causes the map generation unit 112 to assign each content presented by the event to the environment (viewing space) related to the user 30 on the basis of the evaluation result of the matching evaluation in Step S203.

(Assignment of Content to Each Viewing Area)

The processing of Step S203 and Step S204 described above will be described in more detail. In the matching evaluation between each venue where the content is presented and the viewing space of the user 30, a positional relationship between the pieces of content and a positional relationship of each viewing area in the viewing space can be used. Moreover, in the matching evaluation, the degree of participation of the user in the content, the size of the venue where the content is presented, the distribution form of the video, and the like are considered.

The degree of participation of the user will be described. The degree of participation of the user varies depending on the content. Also in the remote event performed by the distribution, it is assumed that the user's call or the like is reflected in the content. For example, a content in which the degree of participation of the user in the content is high, such as a common hand, a call, or a chorus from the user in the content presentation in the real space, is standardized, is defined as the content in which the degree of participation is high. In the case of the content having a high degree of participation, it is assumed that the user desires to perform the user action in the remote event, or the content is captured as the production.

It is preferable to select, as the viewing area, a space in which the participant can more enjoy the content with a high degree of participation. For example, in the case of content in which the user gives a loud voice, there is a possibility that the user hesitates in consideration of the influence on the surrounding environment in a room in a normal soundproof environment. Therefore, as the presentation position at which the content with a high degree of participation is presented, for example, consideration is made to assign an area with high soundproofing to the viewing region.

When the presentation position of the content is assigned to the viewing area, it is preferable to consider the size of the venue where the content is presented. For example, it is conceivable to assign the content presented at the largest venue among the plurality of venues to the largest viewing area among the plurality of viewing areas in the viewing space of the user.

Furthermore, when the presentation position of the content is assigned to the viewing area, it is preferable to consider a distribution form of distributing the video of the content. That is, the viewing experience of the user differs depending on whether a display device for displaying the content in the viewing region is a fixed angle of view (including switching) on the premise of FPD or a 360° video including a free viewpoint such as eyewear. Therefore, it is conceivable to determine the content to be assigned to the viewing area according to the distribution format of the content in the viewing area, for example, either the fixed angle of view or the 360° video.

Specific Example of Content Assignment to Viewing Space

Next, the assignment of the content to the viewing space will be described more specifically. For example, there is a collective event as a music festival in which performers W, X, Y, and Z appear, and each content presented in the collective event is spatially arranged with a room illustrated as the three-dimensional model 40 in FIG. 11 as a viewing space. Furthermore, each content is assumed to be a 360° video in which the viewpoint and the sound image are switched according to the position and direction of the user 30.

As illustrated in FIG. 11, four reference positions A to D are provided for the room as the viewing space this time. Here, in the room, in a case where continuity of space is taken into consideration, three viewing areas indicated by area information [1], [2], and [3] are set as the viewing areas in which content can be arranged, as illustrated in the section (b) of FIG. 11. Therefore, an upper limit of the number of pieces of content simultaneously arranged in the viewing space is set to [3]. On the other hand, since there are four pieces of content to be arranged in the target event, the arrangement priority is determined.

FIG. 17 is a schematic diagram illustrating an example of information that can be applied to the embodiment and is used to determine the arrangement of each content. In the example of FIG. 17, this information includes information of items "performer", "genre", "preference of user", "degree of participation of user", and "venue size" as the information. An item "arrangement area" at the right end of FIG. 17 indicates a viewing area in which each content is arranged, the viewing area being determined on the basis of each item described above. Furthermore, FIG. 17 illustrates information regarding content presented in parallel in a specific time zone in an event.

The item "performer" indicates a performer who presents content in parallel in the time zone, and in the example of FIG. 17, performers W, X, Y, and Z are indicated. The information in the item "genre" is genre information indicating a type (genre) of the content presented by the performer indicated in the item "performer". In the example of FIG. 17, genre information indicating a genre of content presented by each of the performers W, X, Y, and Z is [rock], [rock], [idle], and [jazz], respectively.

In FIG. 17, the information of the item "preference of use" is preference information indicating the preference of the user for the performer indicated in the item "performer" or the content presented by the performer. The preference information of the item "preference of user" is input by the user 30 who views each content, and indicates the preference of the user 30 with respect to the corresponding performer, that is, the degree of preference. In the example of FIG. 17, in the information of the item "preference of user", the preference is [high], [low], [medium], and [medium] for each of the performers W, X, Y, and Z as the preference information. When the value of the item "preference of user" is [high], it indicates that the degree of preference of the user 30 for the corresponding performer or the content presented by the performer is high, when the value is [low], it indicates that the degree of preference is low, and when the value is [medium], it indicates that the degree of preference is medium.

In FIG. 17, the information of the item "degree of participation of user" is participation degree information indicating a degree of participation of the user in the content as the entire user who views the content presented by the performer indicated in the item "performer". In this case, it is conceivable to acquire the user participation degree from, for example, the reference DB 72. The present disclosure is not limited thereto, and the item "degree of participation of user" may be a degree of participation input by the user 30 who views the content in his/her own viewing space.

The information of the item "venue size" is size information indicating the size of the venue in the real space in which the content is presented by the performer indicated in the item "performer".

The map generation unit 112 weights the content arranged in the viewing space on the basis of the value of each item in FIG. 17. This weighting will be specifically described.

The map generation unit 112 first prioritizes the content to be arranged in the viewing space according to the value of the item "preference of user" in FIG. 17. In the example of FIG. 17, since the value of the item "preference of user" for the performer X is [low], the map generation unit 112 excludes the performer X from the arrangement content.

Next, the arrangement of the performers W, Y, and Z is performed. As can be seen from FIG. 11, the viewing area indicated by the area information [1] is the largest also in the current space. Therefore, as shown in the item "arrangement area", the map generation unit 112 arranges the performers W whose item "venue size" is [large].

Next, for the performers Y and Z, the item "preference of user" is [medium], and the preference of the user 30 is equivalent, but the item "degree of participation of user" is [high] for the performer Y and [low] for the performer Z, and it can be seen that the performer Y is higher. In this case, it is estimated that the viewing area indicated by the area information [2] is "kitchen", the viewing area indicated by the area information [3] is "bathroom", and the viewing area indicated by the area information [3] has higher airtightness than the viewing area indicated by the area information [2]. Therefore, it is assumed that the viewing area indicated by the area information [3] is more suitable in a case where the user 30 cheers for the presented content or the like. Therefore, as indicated in the item "arrangement area", the map generation unit 112 arranges the performer Y in the viewing area indicated by the area information [3] and arranges the performer Z in the viewing area indicated by the area information [2].

The user 30 experiences the event while moving in the viewing space in which the content is arranged in each viewing area in this way, so that it is possible to obtain the event experience according to the surrounding environment of the user 30.

Figure 18:
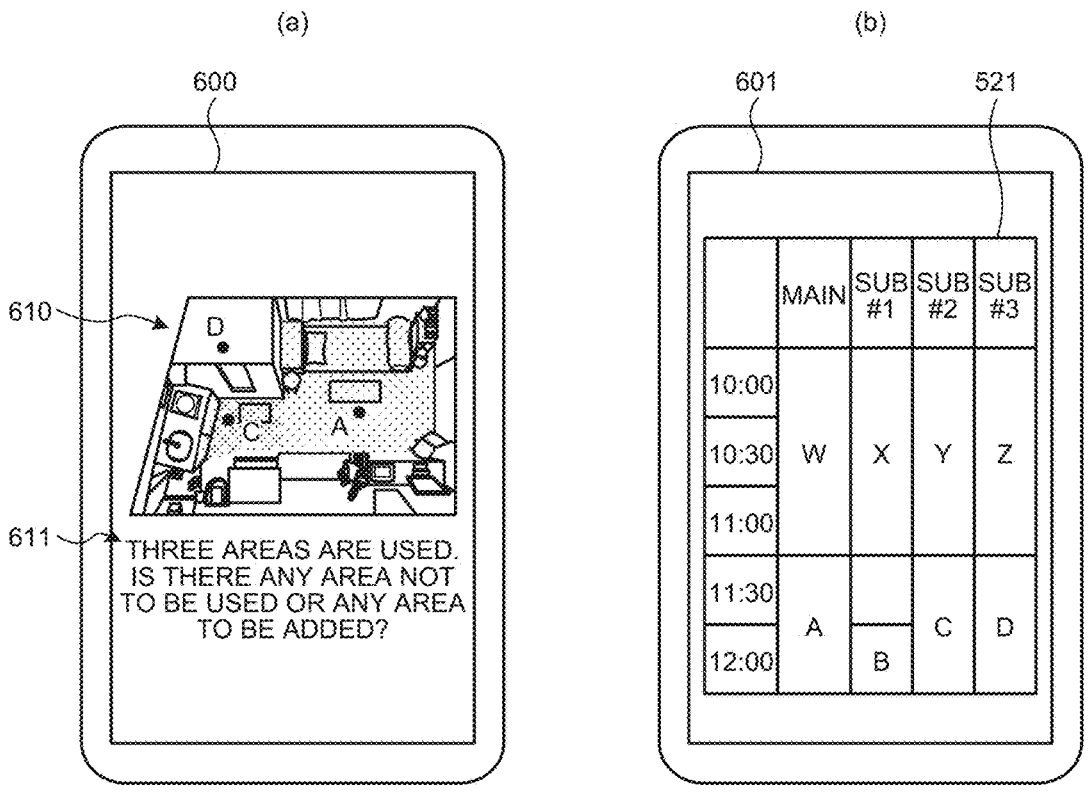
FIG. 18 is a schematic diagram illustrating an example of a user interface for an arranging content in a viewing area, which is applicable to an embodiment.
Figure 18:
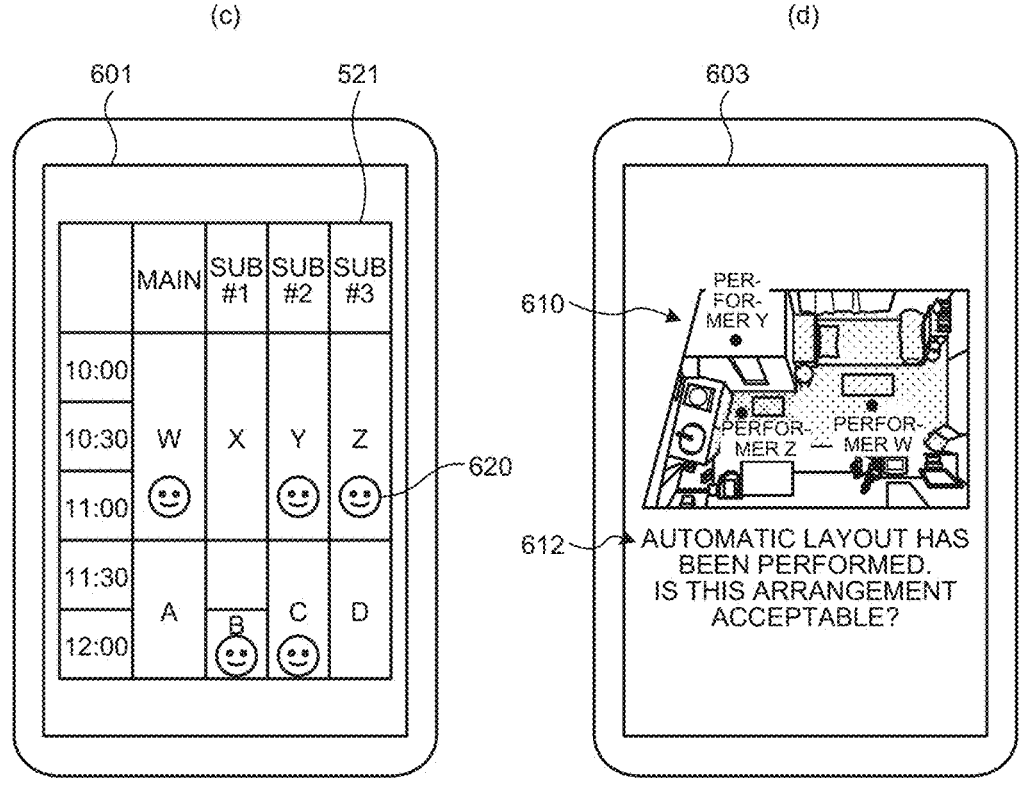

FIG. 18 is a schematic diagram illustrating an example of a user interface for arranging content in a viewing area, which is applicable to the embodiment.

Note that, as described above, the user interface includes at least one of a screen for presenting information to at least the user and an input unit for the user to input information. In the example of sections (a) to (d) in FIG. 18, the user interface includes these screens and an input unit. In a case where an eyewear device is used as the terminal device 10, the input unit can include, for example, the outward camera 1101 that images a hand of the user 30 in order to perform hand tracking.

It is assumed that the space information of the environment (viewing space) in which the user 30 views each content of the event has already been acquired by the processing described with reference to FIG. 6. For example, the user 30 purchases a ticket for content corresponding to viewing, and performs work such as sign-in.

In the terminal device 10, the control unit 100 causes the output control unit 113 to display a user interface screen 600 illustrated in the section (a) of FIG. 18 on the display unit (for example, at least one of the display units 1201L and 1201R). The user interface screen 600 displays a three-dimensional model 610 of the viewing space of the user 30 and a message 611 prompting the user 30 to confirm the viewing area and to add or delete the viewing area.

The user 30 can confirm the environment information of his/her own viewing space on the basis of the user interface screen 600. The control unit 100 presents the maximum number of usable areas as the viewing area on the basis of the environment information (space information) of the viewing space, and prompts the user 30 to confirm availability of each viewing area by, for example, the message 611. In the example of the drawing, three viewing areas are indicated by the reference positions A to C in the three-dimensional model 610. This is because there is a case where the situation of the viewing space differs between when the space information is acquired and when the space information is used, and it is necessary to determine the availability of each viewing area according to the situation.

Furthermore, the control unit 100 may be able to adjust the viewing area at this stage. For example, in a case where the presented viewing area includes a small layout or a dangerous area, the user 30 can execute adjustment such as enlargement/reduction of the viewing area or setting of an excluded area for the viewing area on the basis of the user interface screen 600.

Next, the control unit 100 presents a user interface screen 601 illustrated in the section (b) of FIG. 18, on which the user 30 inputs information indicating preference for each content. In the example of the drawing, the user interface screen 601 displays a time table 521 of events. In this example, in a time zone of the times [10:00] to [11:30], the performer W is arranged on the main stage (main), and the performers X, Y, and Z are arranged on the sub stages #1 to #3 (subs #1 to #3), respectively. Furthermore, a performer A is arranged on the main stage, and performers C and D are arranged on the sub stages #2 and #3 in a time zone of the times [11:30] to [12:30]. Moreover, a performer B is arranged for a time zone of the times [12:00] to [12:30].

The user 30 inputs, to the user interface screen 601, preference information indicating his/her preference to the time table 521 as illustrated in the section (c) of FIG. 18. In the example of the drawing, as the input operation of the preference information, the user 30 performs, on the terminal device 10, an operation of adding a mark 620 to a performer whose preference is high in the time table 521, that is, who is scheduled to view the content.

In the example in the section (c) in FIG. 18, in the time zone of time [10:00] to [11:30], as illustrated in FIG. 17, marks 620 are attached to the performers W, Y, and Z, and it is indicated that the performers W, Y, and Z plan to view the respective contents presented in the time zone. Furthermore, in the example in the drawing, a mark 620 is attached to the performer C in the time zone of the times [11:30] to [12:30], and to the performer B in the time zone of the times

[12:30] to [12:30], respectively, and it is indicated that the performers C and D are scheduled to view the content presented in the time zones.

When the setting in the section (c) in FIG. 18 is determined, the control unit 100 causes the display unit to display a user interface screen 603 for confirming each set viewing region as illustrated in the section (d) in FIG. 18. The example of the drawing illustrates a state in which the performers W, Y, and 2 are automatically arranged with respect to the reference positions A to C indicating viewing areas, respectively, in a three-dimensional model 610 indicating the viewing space of the user 30. Furthermore, in the example of the drawing, a message 612 for prompting the user 30 to confirm whether the contents automatically arranged are acceptable is displayed on the user interface screen 603.

Note that, in the example of the section (c) in FIG. 18, the mark 620 indicating that the preference is high is directly attached to the time table 521, but this is not limited to this example. For example, the user 30 may input a preferred genre and set content scheduled to be viewed by recommendation from a system side. In this case, for example, the control unit 100 performs the weighting processing as described above on the genre, and reflects a result of the automatic arrangement according to the weighting result on the user interface screen 603 illustrated in the section (d) of FIG. 18. The user 30 confirms the arrangement on the basis of the user interface screen 603.

Furthermore, for example, the arrangement of the content with respect to each viewing area is not limited to the automatic arrangement by the control unit 100, and may be manually performed by the user 30. For example, the user 30 may manually change the arrangement of the content according to the operation on the screen of the user 30.

Moreover, for example, the control unit 100 may automatically arrange the content for each viewing area using the preset map 530 described above as it is. Furthermore, the user 30 can explicitly change the arrangement by performing editing such as rotation or inversion according to the operation of the user 30 on the arrangement based on the preset map 530.

Figure 19:
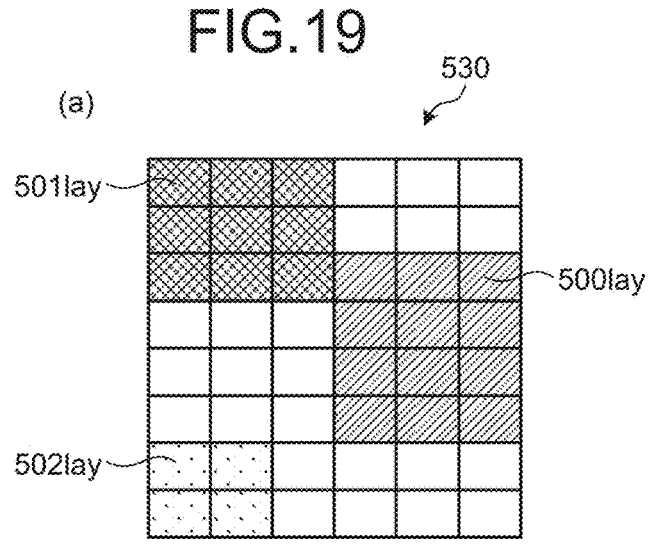
FIG. 19 is a schematic diagram illustrating an example of an arrangement of each content with respect to each viewing area according to an embodiment.
Figure 19:
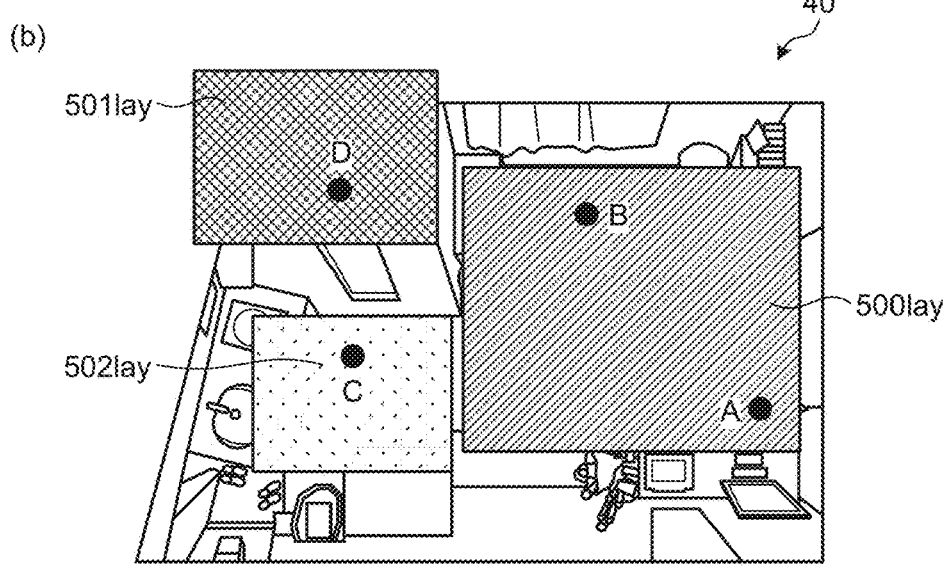
Figure 19:
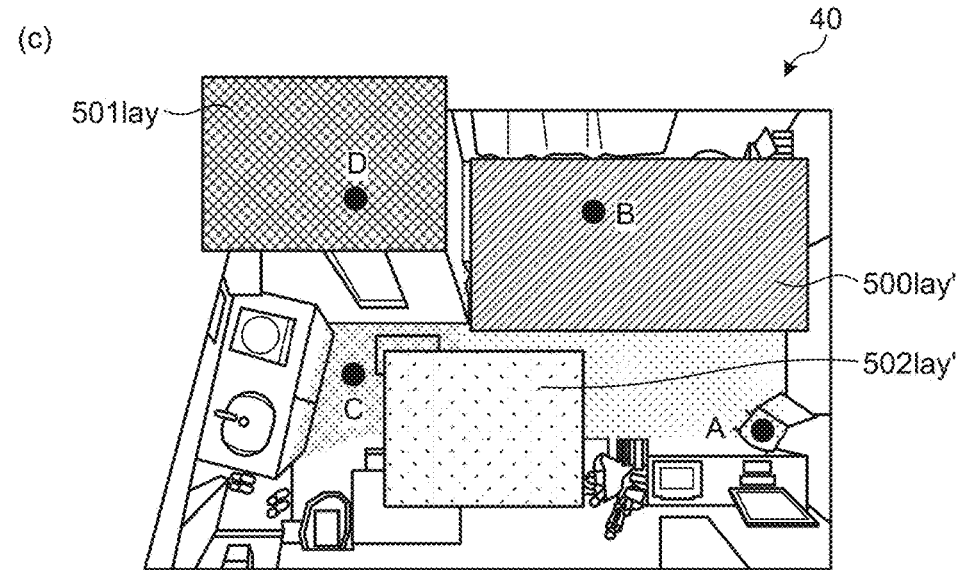

FIG. 19 is a schematic diagram illustrating an example of an arrangement of each content with respect to each viewing area according to the embodiment. A section (a) of FIG. 19 is the same view as the section (a) of FIG. 14 described above, and illustrates an example of the preset map 530 in which the regions 500lay to 502lay corresponding to the stages 500 to 502 are arranged corresponding to the positional relationship of the stages 500 to 502.

A section (b) in FIG. 19 is an example in which the arrangement of the regions 500lay to 502lay on the preset map 530 is applied to the three-dimensional model. 40 indicating the viewing space with the positional relationship as it is. In this example, each of the regions 500lay to 502lay is displayed as a viewing area so as to be superimposed on the image of the three-dimensional model 40.

In the example of the section (b) of FIG. 19, a region 500lay corresponding to the stage 500 which is the main stage is arranged according to the reference position A.

With respect to the region 500lay, a region 501lay corresponding to the stage 501 arranged in the north west of the stage 500 as the sub stage #1 is arranged at the upper left position of the region 500lay in accordance with the relative positional relationship between the stage 500 and the stage 501. Furthermore, with respect to the region 500lay, a region 502lay corresponding to the stage 502 arranged in the south west of the stage 500 as the sub stage #2 is arranged at a lower left position of the region 500lay in accordance with the relative positional relationship between the stage 500 and the stage 502.

A section (c) in FIG. 19 illustrates an example in which the arrangement of each of the regions 500lay to 502lay in the section (b) in FIG. 19 is changed according to the operation of the user 30. For example, the control unit 100 displays an image as illustrated in the section (b) of FIG. 19 on the screen of the display unit. On the screen, the user 30 can designate a region to be moved among the regions 500lay to 502lay and move the region.

In the example of the section (c) of FIG. 19, the position of the region 502lay is moved to the right to be the region 502lay' as the viewing area, and the region 500lay is reduced in the vertical direction on the diagram to be the region 500lay' as the viewing area so as not to overlap with the region 502lay. Such a change in shape accompanying the movement of the region is controlled by the control unit 100.

4. Viewing Processing According to Embodiment

Figure 20:
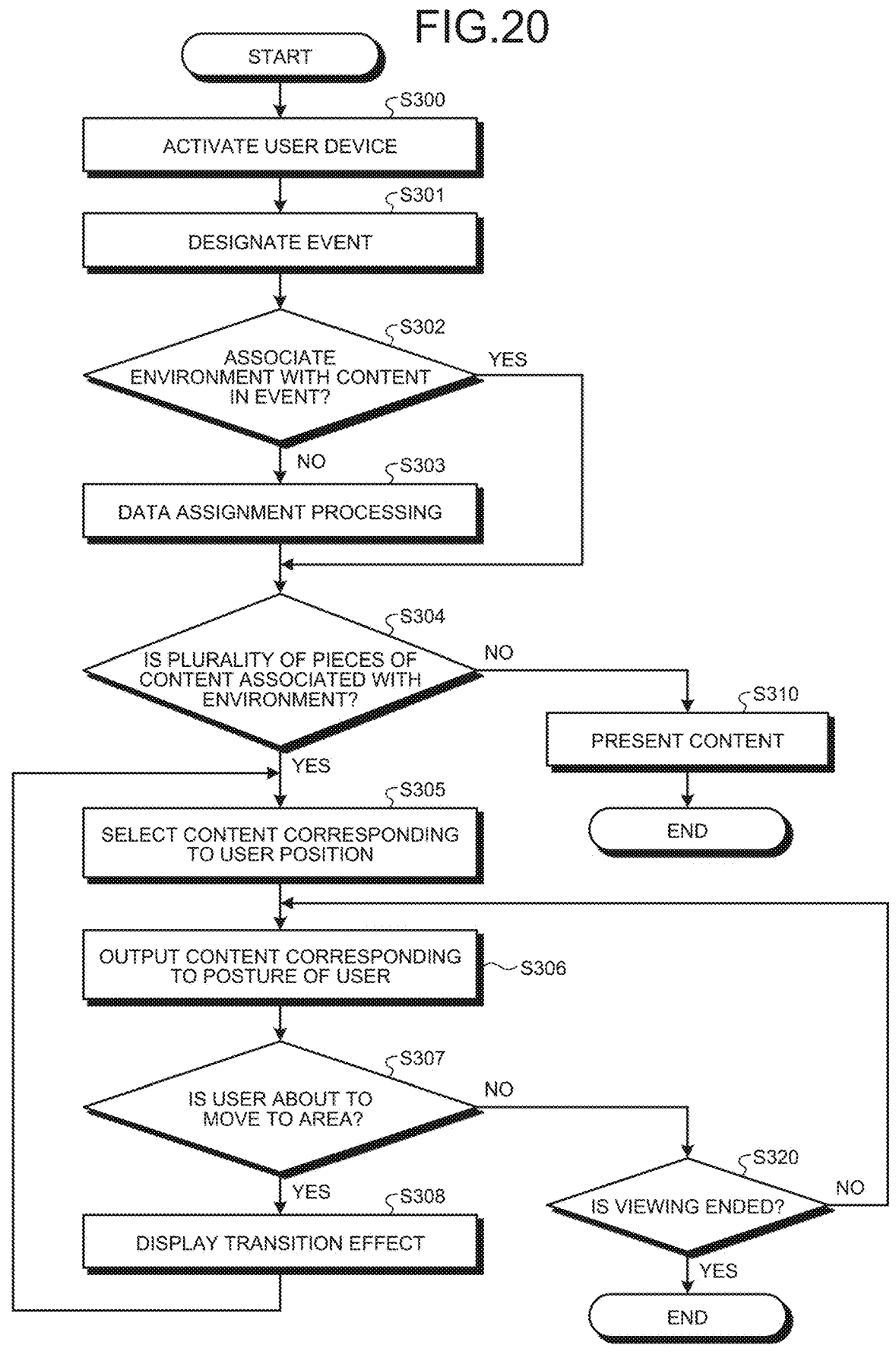
FIG. 20 is a flowchart illustrating an example of content viewing processing according to an embodiment.

Next, content viewing processing according to the embodiment will be described. FIG. 20 is a flowchart illustrating an example of content viewing processing according to the embodiment.

In FIG. 20, in Step S300, the terminal device 10 is activated according to, for example, an operation of the user 30, and the information processing program according to the embodiment is executed to configure the control unit 100. In the terminal device 10, the control unit 100 requests event information from the server 20, for example. The server 20 transmits the event information to the terminal device 10 in response to the request. In the terminal device 10, the control unit 100 causes the display unit to display a screen for designating the event transmitted from the server 20.

In the next Step S301, the control unit 100 designates a target event according to the operation of the user 30. In response to the event designation operation, the control unit 100 requests the server 20 for event information including performer information, the event map 50, the time table 520, and the like, for example. The control unit 100 acquires the event information transmitted from the server 20 in response to this request.

In the next Step S302, the control unit 100 determines whether or not the viewing environment of the user 30 is associated with each content presented in the event. In a case where the control unit 100 determines that the association has not been made (Step S302, "No"), the processing proceeds to Step S303. In Step S303, the control unit 100 executes the processing according to the flowchart of FIG. 6 described above, and assigns each content in the event to each viewing area in the viewing space of the user 30. Thereafter, the processing proceeds to Step S304.

On the other hand, in a case where it is determined in Step S302 that association with each content presented in the event has been made (Step S302, "Yes"), the control unit 100 skips the processing in Step S303 and shifts the processing to Step S304.

In Step S304, the control unit 100 determines whether or not a plurality of pieces of content is associated with the viewing space of the user 30. In a case where the control unit 100 determines that only single content is associated with the viewing space of the user 30 (Step S304, "No"), the processing proceeds to Step S310. In Step S310, the control unit 100 presents the content in the viewing space and terminates the series of processing.

On the other hand, in a case where the control unit 100 determines that the plurality of pieces of content is associated with the viewing space of the user 30 in Step S304 (Step S304, "Yes"), the processing proceeds to Step S305. In this case, the display position of each of the plurality of pieces of content is arranged in each of the plurality of viewing areas in the viewing space.

In the next Step S305, the control unit 100 selects content according to the position of the user 30 from the plurality of pieces of content. That is, the control unit 100 acquires the current position of the user 30 by the location positioning unit 102, and detects in which viewing area in the viewing space the user 30 is located on the basis of the acquired current position. The control unit 100 performs selection from the plurality of pieces of content according to the viewing area corresponding to the position of the user 30.

In next Step S306, the control unit 100 outputs the content selected in Step S305. For example, the control unit 100 extracts the content selected in Step S305 from each content presented at each of the stages 500 to 502 transmitted from the streaming server 70. The control unit 100 outputs the extracted content in the viewing area where the user 30 currently exists.

In the next Step S307, the control unit 100 determines whether or not the user 30 is about to move to another viewing area. The control unit 100 can detect presence or absence of movement and a moving direction of the user 30 on the basis of, for example, a positioning output by the location positioning unit 102 and outputs of the gyro sensor 1104, the acceleration sensor 1105, and the azimuth sensor 1106. The control unit 100 can estimate whether or not the user 30 is about to move to another viewing area on the basis of the position and the moving direction of the user 30.

In a case where the control unit 100 determines that the user 30 is about to move to another viewing area (Step S307, "Yes"), the processing proceeds to Step S308. In Step S308, the control unit 100 displays the transition effect when moving across the viewing area on the display unit. A specific example of the transition effect will be described later. After displaying the transition effect in Step S308, the control unit 100 returns the processing to Step S305.

On the other hand, in a case where the control unit 100 determines that the user 30 is not about to move to another viewing area in Step S307 (Step S307, "No"), the processing proceeds to Step S320. In Step S320, the control unit 100 determines whether or not the user 30 has finished viewing all the contents of the event. In a case where the control unit 100 determines that the viewing has ended according to, for example, a predetermined operation or the like on the terminal device 10 (Step S320, "Yes"), the series of processing according to the flowchart of FIG. 20 is ended.

On the other hand, when determining that the viewing of the content by the user 30 has not ended (Step S320, "No"), the control unit 100 returns the processing to Step S306.

(Transition Effect Display)

Next, display of the transition effect in Step S308 described above will be described. As an example, consider a case where the user 30 moves from a viewing area A where the user is viewing content A to a viewing area B for viewing content B. In this case, the display of the display unit is switched from the content A to the content B at the moment when the user 30 enters the viewing area B from the viewing area A. Such abrupt switching of displayed content may impair a sense of immersion. Therefore, it is preferable that a transition region indicated as the region 543 in FIG. 15 is provided at a boundary portion between the viewing area A and the viewing area B, and predetermined video processing indicating transition from the content A to the content B is given as a transition effect in the transition region.

As an example of the transition effect, for example, the control unit 100 pre-reads the content output in the viewing area B of the movement destination, fades out the content A and fades in the content B in the transition region, and processes the content A and the content B. In this case, the control unit 100 may set an amount of fade-in and fade-out depending on the moving direction and speed of the user 30.

As another example of the transition effect, the control unit 100 may output content for movement prepared in advance in the transition region. As the content for movement, for example, a video reconstructed by a three-dimensional model or the like may be output in the transition region. For example, it is conceivable that the control unit 100 reconstructs, as a three-dimensional model, a scene or the like in a moving route between venues in the real space. Since an amount of movement from the viewing area A to the viewing area B is smaller than an amount of movement in the actual venues, in these cases, it is conceivable to perform high-speed reproduction for the reproduction speed of the video output in the transition region.

Here, in a case where the user 30 moves in the viewing area, the control unit 100 may adjust the movement amount in the transition effect according to the size of the arranged area. For example, in a case where the set viewing area is wide and a case where the set viewing area is narrow, the relative movement amount in the viewing area is different even if the actual movement amount of the user is the same. Therefore, it is preferable that the control unit 100 adjusts the movement amount in the content in consideration of the size of the set viewing area and the size of the venue in the real space in which the content assigned to the viewing area is presented.

Furthermore, in a case where it is difficult to spatially separate the viewing area A and the viewing area B, for example, by prompting the user 30 to change the illumination environment, the control unit 100 may allow the separation between the viewing area A and the viewing area B to be sensually promoted. For example, it is conceivable to make the brightness of the illumination different between the viewing area A and the viewing area B.

Note that, in a case where content presented in an event is viewed by a plurality of persons in the same viewing area, when a plurality of users enters the same viewing area, the size of the viewing area may be enlarged with respect to the initially set size. That is, the map generation unit 112 can set the viewing area according to the number of users included in the viewing area. Furthermore, the map generation unit 112 can dynamically set the viewing area according to a change in the number of users included in the viewing area.

Figure 21:
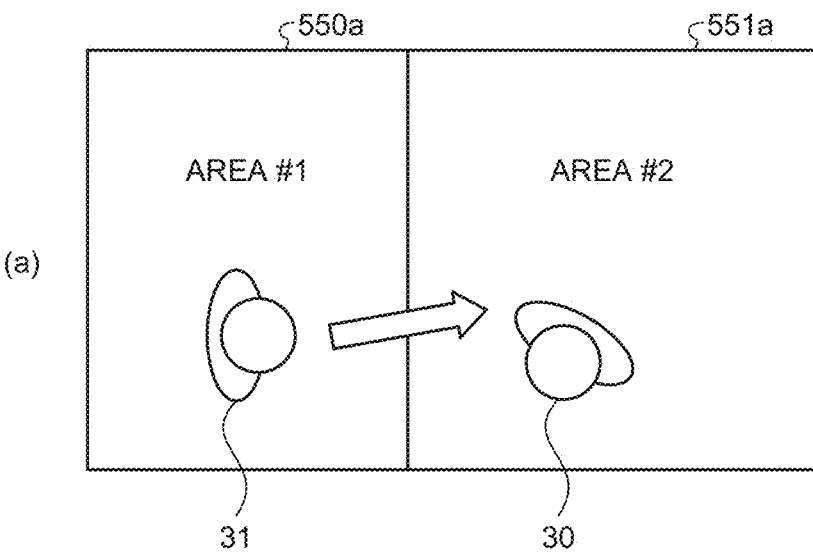
FIG. 21 is a schematic diagram illustrating an example of setting of a viewing area according to the number of users in the viewing area according to an embodiment.
Figure 21:
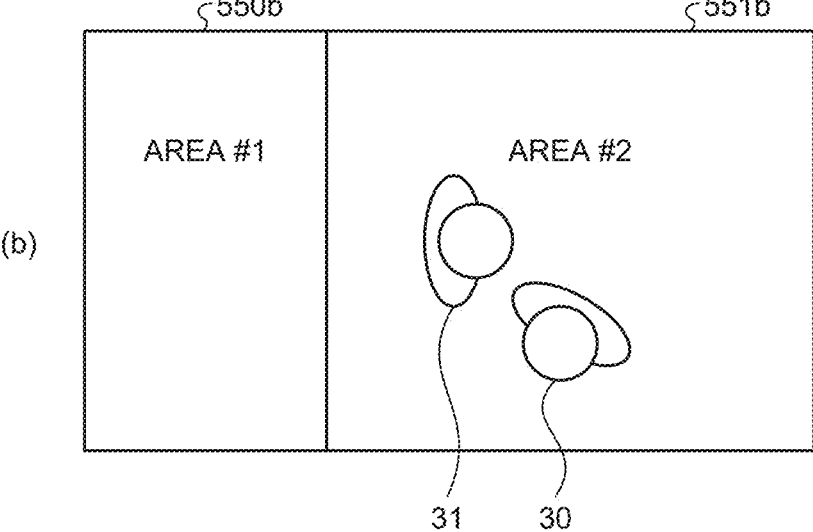

FIG. 21 is a schematic diagram illustrating an example of the setting of the viewing area according to the number of users in the viewing area according to the embodiment. Initially, as illustrated in a section (a) of FIG. 21, it is assumed that a user 31 wearing own terminal device 10 is initially present in a viewing area 550a (area #1), and a user 30 wearing own terminal device 10 is similarly present in a viewing area 551a (area #2). For example, the control unit 100 sets the size and the like of the viewing area 551a assuming that the number of users is 1.

Consider a case where the user 31 moves from the viewing area 550a to the viewing area 551a where the user 30 is. In this case, two users of the users 30 and 31 exist in the viewing area 551a, and if the viewing area 551a is set assuming one user 30, in a case where the users 30 and 31 move or the like, there is a possibility that the user 30 and the user 31 come in contact with each other or collide with each other. Therefore, as illustrated in a section (b) of FIG. 21, the control unit 100 enlarges the viewing area 551a to set a viewing area 551b corresponding to two users, namely, the users 30 and 31. The viewing area 550a in which the user 31 has disappeared and the number of users has become [0] is a reduced viewing area 550b.

Furthermore, in a case where a plurality of users views the content of the collective event in each environment (viewing space), an adjustment amount of the movement amount in each environment and the time required for physical movement are different depending on each environment. Therefore, in order to ensure the experience that the users move between the contents together in the same event, in the terminal device 10 worn by each user, the moving speed in the environment may be adjusted between the users, and processing for achieving consistency in the moving time may be performed. In this case, the adjustment of the moving time between the users may be performed in the server 20 or may be performed by directly communicating between the terminal devices 10.

Note that, in the above description, it has been described that the information processing system 1 according to the embodiment targets each content presented in the event held in the real space, but this is not limited to this example. That is, the information processing system 1 according to the embodiment is also applicable to an event held in the virtual space. Furthermore, the information processing system 1 can also be applied to an event held in a two-dimensional space that presents content based on two-dimensional information such as a video or a painting.

As described above, according to the information processing system 1 according to the embodiment, the user can experience the movement between the plurality of venues in a pseudo manner by moving each viewing area provided in the viewing space. Therefore, in the remote event by the distribution, it is possible to give the user a more immersive feeling.

Furthermore, according to the information processing system 1 according to the embodiment, the display position of each content in the viewing space of the user is set in correspondence with the positional relationship of each venue in the real space. Therefore, the user can simulatively obtain an experience of moving in each venue in the real space in the viewing space, and can obtain a more immersive feeling in the remote event by distribution.

Furthermore, in the information processing system 1 according to the embodiment, when the user moves across the viewing area, the transition effect for the transition of the content can be given. Therefore, even when the user moves across the viewing area and views another content, it is possible to suppress a sense of discomfort felt by the user due to sudden switching of the content. Therefore, the user can obtain a more immersive feeling in the remote event by the distribution.

Note that the effects described in the present specification are merely examples and are not limited, and other effects may be provided.

Note that the present technique can also have the following configurations.

(1) An information processing apparatus comprising
 a control unit that, based on first space information regarding a distribution source space with which a plurality of pieces of content is associated and second space information regarding a viewing space in which the plurality of pieces of content is viewed, determines a presentation position of each of the plurality of pieces of content in the viewing space.

(2) The information processing apparatus according to the above (1), wherein the viewing space includes a plurality of viewing regions, and the control unit determines the presentation position of each of the plurality of pieces of content with respect to each of the plurality of viewing regions based on the first space information and the second space information.

(3) The information processing apparatus according to the above (2), wherein a user who views the plurality of pieces of content is movable between the plurality of viewing regions.

(4) The information processing apparatus according to the above (2) or (3), wherein the first space information includes first position information indicating a position of each of a plurality of presentation areas in which each of the plurality of pieces of content is presented, the second space information includes second position information indicating positions of the plurality of viewing regions, and the control unit determines the presentation position of each of the plurality of pieces of content to each of the plurality of viewing regions having a positional relationship corresponding to each of the plurality of presentation regions based on the first position information and the second position information.

(5) The information processing apparatus according to any one of the above (2) to (4), wherein the first space information includes preference information indicating a degree of preference of a user who views the plurality of pieces of content with respect to each of the plurality of pieces of content, and the control unit selects content having each of the plurality of viewing regions as the presentation position from among the plurality of pieces of content based on the preference information included in the first space information.

(6) The information processing apparatus according to any one of the above (2) to (5), wherein the first space information includes information indicating a type of each of the plurality of pieces of content, and the control unit controls which of the plurality of viewing regions the presentation position of each of the plurality of pieces of content is determined based on the information indicating the type included in the first space information.

(7) The information processing apparatus according to any one of the above (2) to (6), wherein the control unit sets the plurality of viewing regions based on at least one of division information, role information, structure information, floor surface information, shape information, and facility information for the viewing space.

(8) The information processing apparatus according to any one of the above (2) to (7), wherein the control unit presents a predetermined effect in a region including a boundary between two adjacent viewing regions among the plurality of viewing regions.

(9) The information processing apparatus according to the above (8), wherein the predetermined effect includes at least one of a visual effect and an auditory effect.

(10) The information processing apparatus according to the above (8) or (9), wherein the predetermined effect is a cross-fade of content presented in each of the two viewing regions.

(11) The information processing apparatus according to the above (8) or (9), wherein the predetermined effect is presentation of content for movement prepared in advance.

(12) The information processing apparatus according to the above (11), wherein the content for movement includes a content based on a scene of a moving route when moving between a position where content whose presentation position is one viewing region of the two viewing regions among the plurality of pieces of content is presented in the distribution source space and a position where content whose presentation position is the other viewing region of the two viewing regions is presented in the distribution source space.

(13) The information processing apparatus according to the above (12), wherein the content for movement includes a content in which the scene is reconstructed by a three-dimensional model.

(14) The information processing apparatus according to any one of the above (11) to (13), wherein the control unit presents the content for movement at a speed according to a distance between a position where content whose presentation position is one viewing region of the two viewing regions among the plurality of pieces of content is presented in the distribution source space and a position where content whose presentation position is the other viewing region of the two viewing regions among the plurality of pieces of content is presented in the distribution source space.

(15) The information processing apparatus according to any one of the above (2) to (14), wherein the control unit changes a correspondence relationship between each of the plurality of pieces of content and each of the plurality of viewing regions according to a time zone in which the plurality of pieces of content is presented in the distribution source space.

(16) The information processing apparatus according to any one of the above (2) to (15), wherein the control unit presents a user interface for editing a correspondence relationship between each of the plurality of pieces of content and each of the plurality of viewing regions.

(17) The information processing apparatus according to any one of the above (2) to (16), wherein the control unit sets at least one viewing region among the plurality of viewing regions based on a number of users in the viewing region.

(18) The information processing apparatus according to the above (17), wherein the control unit sets the viewing region according to a change in the number of users.

(19) An information processing method executed by a processor, the method comprising a control step of, based on first space information regarding a distribution source space with which a plurality of pieces of content is associated and second space information regarding a viewing space in which the content is viewed, determining a presentation position of each of the plurality of pieces of content in the viewing space.

(20) A computer-readable recording medium in which an information processing program is recorded, the program causing a computer to execute a control step of, based on first space information regarding a distribution source space with which a plurality of pieces of content is associated and second space information regarding a viewing space in which the content is viewed, determining a presentation position of each of the plurality of pieces of content in the viewing space.

REFERENCE SIGNS LIST

1 INFORMATION PROCESSING SYSTEM
10 TERMINAL DEVICE
20 SERVER
30, 31 USER
40, 610 THREE-DIMENSIONAL MODEL
50 EVENT MAP
70 STREAMING SERVER
71 CONTENT DB
72 REFERENCE DB
100 CONTROL UNIT
101 SENSOR UNIT
102, 1509 LOCATION POSITIONING UNIT
103 OUTPUT UNIT
110 USER INFORMATION ACQUISITION UNIT
111 ENVIRONMENT INFORMATION ACQUISITION UNIT
112 MAP GENERATION UNIT
113 OUTPUT CONTROL UNIT
114 CONTENT INFORMATION ACQUISITION UNIT
115 COMMUNICATION UNIT
116 OPERATION INPUT UNIT
300, 600, 601, 603 USER INTERFACE SCREEN
500, 501, 502 STAGE
500*lay*, 500*lay'*, 501*lay*, 502*lay*, 502*lay'*, 540*lay*, 541*lay*, 542*lay*, 543, 544 REGION
520, 521 TIME TABLE
530 PRESET MAP
620 MARK
1101 OUTWARD CAMERA
1104 GYRO SENSOR
1105 ACCELERATION SENSOR
1106 AZIMUTH SENSOR
12011, 1201R DISPLAY UNIT
1505 STORAGE DEVICE

The invention claimed is:

1. An information processing apparatus comprising circuitry configured to determine, based on first space information regarding a distribution source space with which a plurality of pieces of content is associated and second space information regarding a viewing space in which the plurality of pieces of content is viewed, a presentation position of each of the plurality of pieces of content in the viewing space, and present the plurality of pieces of content according to the determined presentation position for each piece of content, wherein the viewing space includes a plurality of viewing regions with boundaries between adjacent viewing regions, and wherein the circuitry presents each piece of content according to a distance from the piece of content to one or more of the boundaries between adjacent viewing regions.

2. The information processing apparatus according to claim 1, wherein the circuitry determines the presentation position of each of the plurality of pieces of content with respect to each of the plurality of viewing regions based on the first space information and the second space information.

3. The information processing apparatus according to claim 2, wherein a user who views the plurality of pieces of content is movable between the plurality of viewing regions.

4. The information processing apparatus according to claim 2, wherein the first space information includes first position information indicating a position of each of a plurality of presentation areas in which each of the plurality of pieces of content is presented, wherein the second space information includes second position information indicating positions of the plurality of viewing regions, and wherein the circuitry determines the presentation position of each of the plurality of pieces of content to each of the plurality of viewing regions having a positional relationship corresponding to each of the plurality of presentation regions based on the first position information and the second position information.

5. The information processing apparatus according to claim 2, wherein the first space information includes preference information indicating a degree of preference of a user who views the plurality of pieces of content with respect to each of the plurality of pieces of content, and wherein the circuitry selects content having each of the plurality of viewing regions as the presentation position from among the plurality of pieces of content based on the preference information included in the first space information.

6. The information processing apparatus according to claim 2, wherein the first space information includes information indicating a type of each of the plurality of pieces of content, and wherein the circuitry controls which of the plurality of viewing regions the presentation position of each of the plurality of pieces of content is determined based on the information indicating the type included in the first space information.

7. The information processing apparatus according to claim 2, wherein the circuitry sets the plurality of viewing regions based on at least one of division information, role information, structure information, floor surface information, shape information, and facility information for the viewing space.

8. The information processing apparatus according to claim 2, wherein the circuitry presents a predetermined effect in a region including a boundary between two adjacent viewing regions among the plurality of viewing regions.

9. The information processing apparatus according to claim 8,
wherein the predetermined effect includes at least one of a visual effect or an auditory effect.

10. The information processing apparatus according to claim 8,
wherein the predetermined effect includes a cross-fade of content presented in each of the two viewing regions.

11. The information processing apparatus according to claim 8,
wherein the predetermined effect includes presentation of content for movement prepared in advance.

12. The information processing apparatus according to claim 11,
wherein the content for movement includes content based on a scene of a moving route when moving between a position where content whose presentation position is a first viewing region of the two viewing regions among the plurality of pieces of content is presented in the distribution source space and a position where content whose presentation position is a second viewing region of the two viewing regions is presented in the distribution source space.

13. The information processing apparatus according to claim 12,
wherein the content for movement includes content in which the scene is reconstructed by a three-dimensional model.

14. The information processing apparatus according to claim 11,
wherein the circuitry presents the content for movement at a speed according to a distance between a position where content whose presentation position is a first viewing region of the two viewing regions among the plurality of pieces of content is presented in the distribution source space and a position where content whose presentation position is a second viewing region of the two viewing regions among the plurality of pieces of content is presented in the distribution source space.

15. The information processing apparatus according to claim 2,
wherein the circuitry changes a correspondence relationship between each of the plurality of pieces of content and each of the plurality of viewing regions according to a time zone in which the plurality of pieces of content is presented in the distribution source space.

16. The information processing apparatus according to claim 2,
wherein the circuitry presents a user interface for editing a correspondence relationship between each of the plurality of pieces of content and each of the plurality of viewing regions.

17. The information processing apparatus according to claim 2,
wherein the circuitry sets at least one viewing region among the plurality of viewing regions based on a number of users in the viewing region.

18. The information processing apparatus according to claim 17,
wherein the circuitry sets the viewing region according to a change in the number of users.

19. An information processing method executed by a processor, the method comprising:
determining, based on first space information regarding a distribution source space with which a plurality of pieces of content is associated and second space information regarding a viewing space in which the content is viewed, a presentation position of each of the plurality of pieces of content in the viewing space; and
presenting the plurality of pieces of content according to the determined presentation position for each piece of content,
wherein the viewing space includes a plurality of viewing regions with boundaries between adjacent viewing regions,
wherein each piece of content is presented according to a distance from the piece of content to one or more of the boundaries between adjacent viewing regions.

20. A non-transitory computer-readable recording medium having embodied thereon an information processing program, which when executed by a computer causes the computer to execute a method, the method comprising:
determining, based on first space information regarding a distribution source space with which a plurality of pieces of content is associated and second space information regarding a viewing space in which the content is viewed, a presentation position of each of the plurality of pieces of content in the viewing space; and
presenting the plurality of pieces of content according to the determined presentation position for each piece of content,
wherein the viewing space includes a plurality of viewing regions with boundaries between adjacent viewing regions,
wherein each piece of content is presented according to a distance from the piece of content to one or more of the boundaries between adjacent viewing regions.

* * * * *